(12) United States Patent
Bevan et al.

(10) Patent No.: US 9,295,022 B2
(45) Date of Patent: Mar. 22, 2016

(54) WIRELESS NETWORK SUPPORTING EXTENDED COVERAGE OF SERVICE

(75) Inventors: Frances Bevan, Philadelphia, PA (US); David Markowitz, Plymouth Meeting, PA (US); Michael Rekstad, Langhorne, PA (US); Jae Sim, Upper Darby, PA (US); Christopher Stone, Newtown, PA (US)

(73) Assignee: Comcast Cable Communications, LLC., Philadelphia, PA (US)

( * ) Notice: Subject to any disclaimer, the term of this patent is extended or adjusted under 35 U.S.C. 154(b) by 0 days.

(21) Appl. No.: 13/475,045

(22) Filed: May 18, 2012

(65) Prior Publication Data

US 2013/0308470 A1  Nov. 21, 2013

(51) Int. Cl.
| | | |
|---|---|---|
| *H04W 64/00* | (2009.01) | |
| *H04W 48/18* | (2009.01) | |
| *H04W 4/02* | (2009.01) | |
| *H04W 16/28* | (2009.01) | |
| *H04W 52/14* | (2009.01) | |
| *H04W 4/00* | (2009.01) | |
| *H04W 36/32* | (2009.01) | |

(52) U.S. Cl.
CPC .............. *H04W 64/00* (2013.01); *H04W 4/028* (2013.01); *H04W 4/008* (2013.01); *H04W 4/02* (2013.01); *H04W 16/28* (2013.01); *H04W 36/32* (2013.01); *H04W 48/18* (2013.01); *H04W 52/143* (2013.01)

(58) Field of Classification Search
None
See application file for complete search history.

(56) References Cited

U.S. PATENT DOCUMENTS

| 6,212,405 B1 * | 4/2001 | Jiang et al. ..................... 455/561 |
| 6,882,845 B2 * | 4/2005 | Sato et al. ..................... 455/446 |
| 6,944,454 B1 * | 9/2005 | Lee et al. ..................... 455/443 |
| 7,890,118 B2 * | 2/2011 | Uta et al. ................... 455/456.1 |
| 8,547,948 B2 * | 10/2013 | Evans et al. ................... 370/339 |
| 8,589,330 B2 * | 11/2013 | Petersen et al. ................. 706/52 |
| 2003/0036409 A1 * | 2/2003 | Sato et al. ..................... 455/561 |
| 2003/0181165 A1 * | 9/2003 | Sugar et al. ..................... 455/69 |
| 2005/0025095 A1 * | 2/2005 | Kim ............................. 370/329 |
| 2007/0077968 A1 * | 4/2007 | Kuzminskiy ............... 455/562.1 |
| 2009/0137249 A1 * | 5/2009 | Horn et al. ................. 455/435.2 |
| 2011/0268060 A1 * | 11/2011 | Heidari et al. ............... 370/329 |
| 2012/0157106 A1 * | 6/2012 | Wang et al. ................... 455/446 |
| 2012/0282942 A1 * | 11/2012 | Uusitalo et al. ............. 455/452.2 |
| 2013/0029645 A1 * | 1/2013 | Schentrup .................. 455/414.1 |

OTHER PUBLICATIONS

Liu, George et al., "A Class of Mobile Motion Prediction Algorithms for Wireless Mobile Computing and Communications," Mobile Networks and Applications, 1996, pp. 113-121.*
"Generic Access Network," Wikipedia, last visited Aug. 12, 2012; pp. 1-6.

(Continued)

*Primary Examiner* — Donald Mills
(74) *Attorney, Agent, or Firm* — Banner & Witcoff, Ltd.

(57) ABSTRACT

A communications access point may provide access to a wireless communications network to a user device located at a first location. The communications access point may determine that the user device is moving from the first location to a second location where access to the wireless network is limited or not available. In response to the determination, the communications access point may provide access to the wireless network at the second location by extending a coverage area of the wireless network.

20 Claims, 9 Drawing Sheets

(56) References Cited

OTHER PUBLICATIONS

Fehrenbacher, "T-Mobile: WiFi-Cellular Launch in September," Tech News and Analysis; Gigaom.com/2006/08/16/t-mobile-wifi-cellular-launch-in-september/, Aug. 16, 2006, last visited Aug. 20, 2012; pp. 1-14.

Murph, "Wi-Fi Alliance launches hotspot certification program, aims to ease cell-to-WiFi handoff woes," www.engadget.com/2011/03/22/wi-fi-alliance-launches-hotspot-certification-program-aims-to-e/, Mar. 22, 2011, last visited Aug. 20, 2012; 1-5.

Higginbotham, "Wi-Fi: It's the other cell network," Broadband News and Analysis; Gigaom.com/broadband/wi-fi-its-the-other-cell-network/, Jul. 1, 2011, last visited Aug. 20, 2012; pp. 1-15.

Donohue, "Wireless Communications/power control in CDMA," AllExperts, en.allexperts.com/q/Wireless-Communications-2435/power-control-CDMA.htm, Apr. 25, 2007, last visited Aug. 20, 2012; pp. 1-3.

Chandra & Lide, "Voice over Wi-Fi and Other Wireless Technologies," Wi-Fi Telephony—Challenges and Solutions for Voice over WLANs, Communications Engineering Series, Chapter 10, published Nov. 8, 2006; pp. 235-260.

\* cited by examiner

| Access Point ID | Access Point Location (latitude, longitude) | Device ID | Device Location (latitude, longitude) | Signal Strength (RSSI) | Bandwidth Consumption |
|---|---|---|---|---|---|
| 00123A84C | 40.027614, -75.246735 | 01A823CD45EF | 40.052848, -75.223389 | 70.4 | 768.1 kbps |
| 00123A84C | 40.027614, -75.246735 | 12AB34CD56EF | 40.044438, -75.184937 | 12.1 | 2.3 Mbps |
| 00123A84C | 40.027614, -75.246735 | 23AB45CD67EF | 40.174291, -75.344238 | 44.8 | 1.8 Mbps |
| 002348C5D | 39.963438, -74.892426 | 01BC23DE45FG | 40.042335, -74.814348 | 75.1 | 45.7 Mbps |
| 002348C5D | 39.963438, -74.892426 | 12BC34DE56FG | 40.025513, -74.871826 | 56.2 | 11.5 Mbps |
| 002348C5D | 39.963438, -74.892426 | 23BC45DE67FG | 39.985538, -74.698792 | 28.3 | 32.2 Mbps |
| 00345CD5E | 39.709321, -75.267334 | 01CD23EF45GH | 39.713525, -75.234375 | 56.7 | 3.1 Mbps |
| 00345CD5E | 39.709321, -75.267334 | 12CD34EF56GH | 39.705074, -75.261841 | 0.0 | 0.0 kbps |
| 00345CD5E | 39.709321, -75.267334 | 23CD45EF67GH | 39.690281, -75.195923 | 55.6 | 0.0 kbps |

| Device ID | Predicted Location (latitude, longitude) | Predicted Time of Arrival | Predicted Signal Strength (RSSI) | Predicted Bandwidth Consumption |
|---|---|---|---|---|
| 01AB23CD45EF | 39.9541, -75.1684 | M1/D1/YYY1 H1:M1:S1 | 90.1 | 3.2 Mbps |
| 12A834CD56EF | 39.9541, -75.1684 | M2/D2/YYY2 H2:M2:S2 | 85.3 | 2.3 Mbps |
| 23A845CD67EF | 39.954129, -75.168478 | M3/D3/YYY3 H3:M3:S3 | 5.3 | 1.8 Mbps |
| 01BC23DE45FG | 40.042335, -74.814148 | M4/D4/YYY4 H4:M4:S4 | 62.7 | 45.7 Mbps |
| 12BC34DE56FG | 39.9541, -75.1684 | M5/D5/YYY5 H5:M5:S5 | 93.2 | 11.5 Mbps |
| 23BC45DE67FG | 39.9541, -75.1684 | M6/D6/YYY6 H6:M6:S6 | 88.3 | 7.6 Mbps |
| 01CD23EF45GH | 39.9541, -75.1684 | M7/D7/YYY7 H7:M7:S7 | 90.2 | 4.2 Mbps |
| 12CD34EF56GH | 39.705074, -75.261841 | M8/D8/YYY8 H8:M8:S8 | 0.0 | 0.0 kbps |
| 23CD45EF67GH | 39.9541, -75.1684 | M9/D9/YYY9 H9:M9:S9 | 89.2 | 3.1 Mbps |

FIG. 6

WIRELESS NETWORK SUPPORTING EXTENDED COVERAGE OF SERVICE

BACKGROUND

The promulgation of wireless technology has facilitated access to networks such as the Internet at virtually any location. Devices such as laptops, tablets, mobile phones, and other portable computing devices are provided with the capability of accessing a variety of wireless networks, such as cellular broadband networks, Wi-Fi hotspots and wireless local area networks (WLANs). Accordingly, users are increasingly relying on their devices to consume high bandwidth applications and data, such as streaming video, while traveling from one location to another.

However, when a traveling user encounters an area with little or no wireless connectivity, such as a "dead zone," the user's device may be disconnected from the wireless network. As a result, the user's experience is negatively impacted by the loss of service. In addition, the typical solution of adding new communications towers to extend network coverage in the "dead zone" has the problematic effect of added costs and delayed network availability.

Therefore, there is a need in the art for improvements in extending network coverage.

SUMMARY

In accordance with various aspects of the disclosure, systems and methods are provided for extending the coverage area of a wireless network for a moving device. In one aspect, by knowing or learning a user's geographical route in advance, the wireless network's data coverage area may be extended to cover areas through which the user and associated devices will travel.

In an embodiment, a service provider may provide, at a first time (e.g., a present time), access to a wireless communications network to a user device at a first geographic location (e.g., a particular latitude, longitude). The service provider may also provide the infrastructure for the wireless communications network, e.g., using a local office and one or more communications access points. The user device may be connected to the wireless network at the first location or may be authorized to (e.g., via a subscription) access the wireless network. The service provider may then determine whether the user device is traveling to a second location where the wireless communications network is not available at the first time. The second location may be a predicted or estimated location at some future point in time and may be determined based on changes in the user device's geographic location, user input indicating the user's planned route of travel, other information indicating the user's route of travel or future locations (e.g., social media information, calendar messages, electronic messages, user preference information), or any other suitable information or combination of information. For example, the service provider may determine whether the user device is or will be traveling towards an area where service may be limited or unavailable, e.g., a communications "dead zone," and, if so, predict or estimate the time that the user device will arrive there. In some implementations, the determination may be initiated in response to determining that the first location is a location within a predetermined range (e.g., 0.5 miles) of the wireless coverage area provided at the first time to the user device at the first location. If the service provider determines that the user device is traveling to a location where the wireless network is not presently available, the service provider may provide access to the wireless communications network to the user device at the second location by extending the coverage area of the wireless communications network.

In some embodiments, the coverage area of the wireless communications network may be extended, for example, by dynamically changing the power, direction, or both of the communications access point (e.g., by changing the direction, gain, or any other suitable parameter of the communications access point's wireless antenna) to extend a coverage area or form a different wireless coverage area. In some embodiments, the coverage area of the wireless network may be extended by concentrating the wireless network to form an overlapping wireless coverage area based on location density information for a population of users or user devices. In some embodiments, the coverage area of the wireless network may be extended by transferring service to another wireless network or, when multiple wireless networks are available, selecting one of the available wireless networks and instructing the user device to transfer service to the selected wireless network. For example, the service provider may select one of the available networks based on security levels, bandwidth availability, usage cost, access authorization, and other suitable criteria that may indicate the best wireless network for the user device's use.

In some embodiments, the service provider may determine location density information for a population of user devices, users (e.g., wireless subscribers), or both and provide the wireless communications network, or access thereto, based on the location density information. For example, the service provider may provide, at the first time, the wireless communications network based on first location density information indicative of the respective locations and bandwidth consumption levels of a population of user devices. The service provider may subsequently determine that one or more of the user devices are respectively being moved, e.g., traveling, to one or more different locations (e.g., actual locations, predicted locations) based on changes in the user device's geographic location, changes in bandwidth consumption levels, user input indicating one or more planned routes of travel, other information indicating users' routes of travel (e.g., social media information, calendar messages, electronic messages, user preference information), or any other suitable information or combination of information. If the service provider determines that one or more user devices are respectively traveling to one or more different locations, the service provider may determine second location density information by, for example, updating the first location density information to reflect the changes in the locations and bandwidth consumption levels of the population of user devices. The service provider may subsequently provide the wireless communications network in a second wireless coverage area different from the first wireless coverage area based on the second location density information.

This summary is not intended to identify required or essential features of the disclosures herein, but instead merely summarizes certain features and variations thereof. Other details and features will also be described in the sections that follow.

BRIEF DESCRIPTION OF THE DRAWINGS

Some features described herein are illustrated by way of example, and not by way of limitation, in the accompanying figures in which like reference numerals refer to similar elements.

FIG. 5 illustrates example location information for a plurality of user devices.

FIG. 6 illustrates example predicted location information for a plurality of user devices.

DETAILED DESCRIPTION

Figure 1:
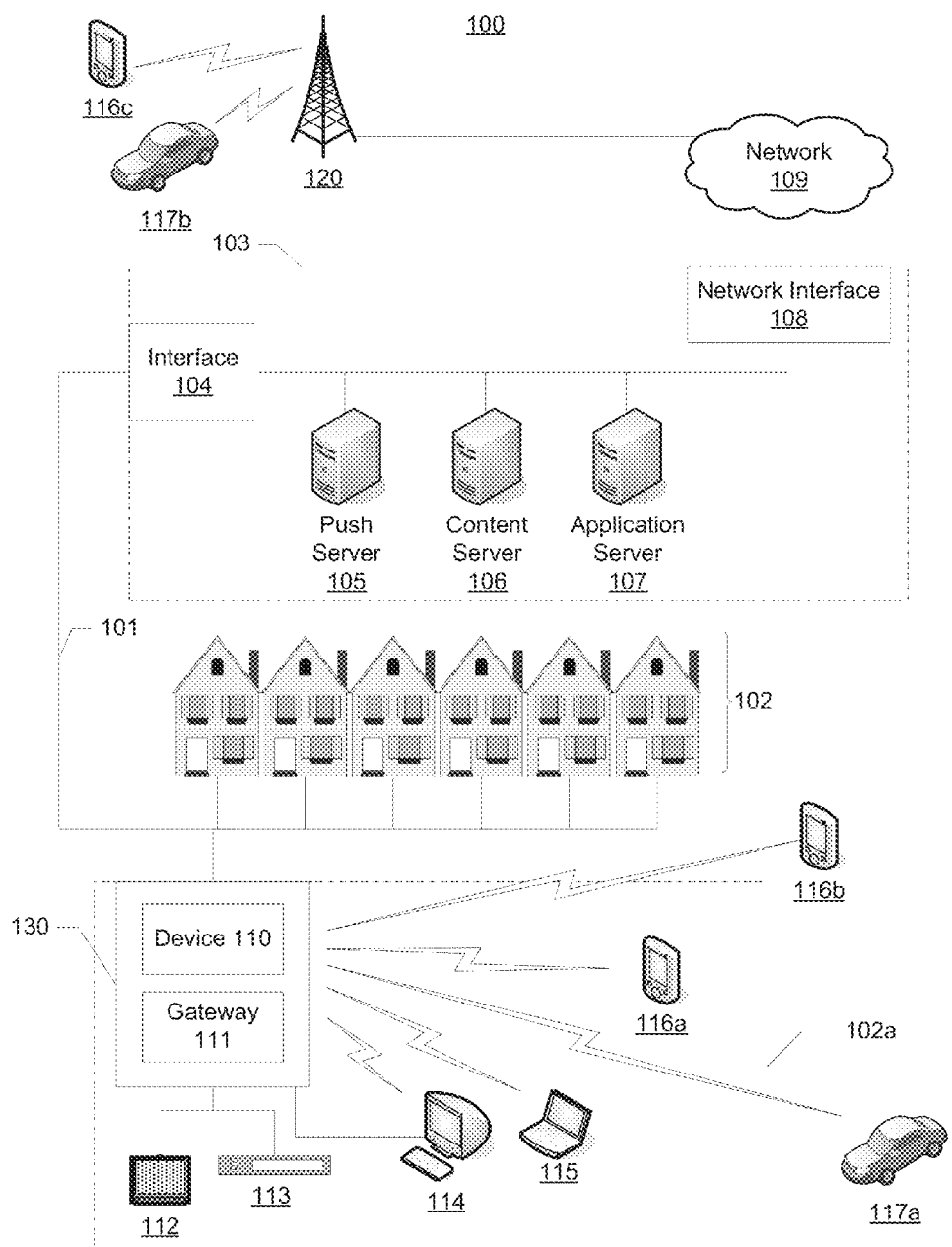
FIG. 1 illustrates an example network environment.

FIG. 1 illustrates an example information distribution network 100 on which many of the various features described herein may be implemented. The illustrated information distribution environment is only one example of a suitable network environment and is not intended to suggest any limitation as to the scope of use or functionality of the disclosure. The illustrated network environment should not be interpreted as having any dependency or requirement relating to any component or combination of components in an information distribution environment. It will be appreciated that the term "network" may refer to either network 100 or a lower-tier network that is within network 100. It will be appreciated that the terms "networks" may refer to only lower-tier networks that are within network 100.

Network 100 may be a telecommunications network, a multi-service operator (MSO) network, a cable television (CATV) network, a cellular network, a wireless network, an optical fiber network, a coaxial cable network, a hybrid fiber-coaxial (HFC) network, or any other suitable type of information distribution network or combination of networks. For example, network 100 may be a cellular broadband network communicating with multiple communications access points, such as communications access point 120, to, to provide communication signals to devices such as wireless device 116c (e.g., a mobile phone, a wireless laptop, a tablet computer, a portable gaming device) and vehicular computing system 117b (e.g., a mobile computing system, navigation system, or entertainment system in an automobile, marine vessel, or aircraft). In another example, network 100 may be a system comprising a termination system (TS) (e.g., optical or cable modem termination system) communicating with numerous gateway interface devices (e.g., gateway interface device 111 in example home 102a). In another example, the network 100 may be a fiber-optic service system comprising optical fibers extending from an optical line terminal (OLT) to numerous optical network terminals (ONTs) communicatively coupled with various gateway interface devices. In another example, the network 100 may be a digital subscriber line (DSL) system that includes local office 103 communicating with numerous gateway interface devices. In another example, network 100 may be an HFC network in which network, e.g., Internet, traffic is routed over both optical and coaxial communication paths to a gateway interface device in or near a user's home. Various aspects of the disclosure may operate on one or more of the networks described herein or any other suitable network architectures now known or later developed.

Network 100 may use a series of interconnected communication links 101 (e.g., coaxial cables, optical fibers, wireless links, etc.) to connect premises such as homes 102 or other user environments to local office 103. Communication links 101 may include any suitable wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other suitable components for communicating data. Data may include, for example, internet data, voice data, weather data, media content, and any other suitable information. Media content may include, for example, video content, audio content, media on demand, video on demand, streaming video, television programs, text listings, graphics, advertisements, and other suitable content.

Local office 103 may transmit downstream information signals onto communication links 101, and each of homes 102 may receive and process those signals. In certain implementations, communication links 101 may originate from local office 103 as a single communications path, and may be split into any suitable number of communication links to distribute data to homes 102 and various other destinations. Although the term home is used by way of example, homes 102 may include any type of user environment, such as single family homes, apartment complexes, businesses, schools, hospitals, parks, and other suitable environments and combinations of environments.

Local office 103 may include interface 104, which may be a computing device configured to manage communications between devices on the network of communication links 101 and backend devices, such as server 105, server 106, and server 107. For example, interface 104 may be a termination system (TS) such as cable modem termination system (CMTS). The TS may be as specified in a standard, such as, in an example of an HFC-type network, the Data Over Cable Service Interface Specification (DOCSIS) standard, published by Cable Television Laboratories, Inc. The TS may be configured to transmit data over one or more downstream channels or frequencies to be received by various devices, such as modems in homes 102, and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol networks, mobile communications networks (e.g., Global System for Mobile Communications (GSM), Code Division Multiple Access (CDMA), and any other suitable 2nd, 3rd, 4th and higher generation cellular communications networks), cellular broadband networks, radio access networks, fiber-optic networks, local wireless networks (e.g., Wi-Fi, WiMAX), satellite networks, and any other suitable networks or combinations of networks. One or more network interfaces 108 may include the corresponding circuitry needed to communicate with one or more external networks 109 and with devices accessible through one or more external networks 109. For example, one or more external networks 109 may communicate with one or more content sources, such as multicast or unicast video sources, which may supply video streams for ultimate consumption by various user devices such as client devices. Devices may include, but are not limited to, personal computers (PCs), server computers, hand-held or laptop computing devices, tablet computing devices, netbook computers, vehicular computing systems, set-top boxes (STBs), digital video recorders (DVRs), programmable consumer electronics, mobile or cellular phones, smart phones, media player devices, entertainment devices, security monitoring devices, medical monitoring devices, electronic apparel, game consoles, and any other suitable devices or combinations of devices.

Local office 103 may include a variety of servers that may be configured to perform various functions. For example, local office 103 may include one or more push servers 105 for generating push notifications to deliver data, commands, or both to devices that are configured to detect such notifications. In another example, push server 105 may transmit an instruction to a device to transfer service from one wireless network or communications access point to another wireless network or communications access point.

Local office 103 may include one or more content servers 106 configured to provide content (e.g., media content) to devices. Content server 106 may include software to validate device identities and entitlements, locate and retrieve requested content, encrypt content, and initiate delivery of content to the requesting device.

Local office 103 may include one or more application servers 107. Application server 107 may be, for example, a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, application server 107 may be used to implement a cache server for the content found on content server 106. Another example application server may be used to provide mobile television services, media on demand services, videoconferencing or video chat services, telemedicine services, location-based services, or any other suitable service or combination of services. Another example application server may be responsible for collecting geographic location information for devices communicatively coupled to network 100. Another example application server may be responsible for monitoring user viewing habits for use in selecting advertisements. Another example application server may be responsible for formatting and inserting advertisements in a video stream being transmitted to various devices.

In certain implementations, local office 103 may determine if a device is authorized to access a network communicatively coupled to local office 103. For example, local office 103 may authenticate devices requesting access to a wireless network using an authentication table stored in any suitable storage device, such as in the memory of server 107. The authentication table may contain authentication information (e.g., username/password, pre-shared key, media access control (MAC) address or other unique identifier) for various devices and may allow for enhanced user experience and bandwidth efficiencies due to faster authentication times and increased ease of network connection. In certain implementations, local office 103 may determine which networks a device is authorized to access when multiple networks are available to the device (e.g., the device is located in an area with overlapping wireless coverage areas). For example, local office 103 may determine if a device is authorized to access a particular network using asymmetric encryption/authentication where the device may be equipped with the applicable public key that matches that of local office 103's private key. In this case, the device and local office 103 may securely exchange a shared secret key and, after authenticating that the key is valid, the device may be authorized to access the network, a storage device, or any other suitable component. In another example, symmetric encryption/authentication may be used.

Homes 102 such as home 102a may include an interface 130, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other device or combination of devices. In certain implementations, device 110 may be a part of, or communicatively coupled to, gateway interface device 111. Gateway 111 may be, for example, a wireless router, a set-top box, a computer server, or any other computing device or combination. For purposes of illustration and not of limitation, it will be understood that the term "gateway" refers to a gateway computing device with Wi-Fi or other wireless network capability, such as a Wi-Fi hotspot.

Gateway interface device 111 may be any suitable computing device for communicating with device 110 to allow one or more other devices in example home 102a to communicate with local office 103, one or more external networks 109, or other devices communicatively coupled thereto. Gateway 111 may be, for example, a wireless router, a set-top box, a computer server, or any other suitable computing device or combination. For example, gateway 111 may be a wireless router and provide an indirect communications path, such as a backhaul connection, to the Internet through local office 103. Gateway 111 may route different media formats (e.g., data, voice, video) and may support unicast, broadcast, multicast, or any other suitable communications traffic.

Gateway 111 may include local network interfaces to provide communication signals to devices such as client devices in or near example home 102a, such as television 112, set-top box 113, personal computer 114, laptop computer 115, wireless devices 116a-b (e.g., wireless laptops, tablet computers, mobile phones, portable gaming devices), vehicular computing system 117a (e.g., a mobile computing system, navigation system, or entertainment system in an automobile, marine vessel, or aircraft) and any other suitable device. Local network interfaces may include, for example, Multimedia Over Coax Alliance (MoCA) interfaces, Ethernet interfaces, universal serial bus (USB) interfaces, wireless interfaces (e.g., IEEE 802.11, IEEE 802.16), Bluetooth interfaces, and other suitable interfaces. In certain implementations, gateway 111 may provide different wired and wireless networks for the devices in example home 102a using different types of wireless components. For example, a first device (e.g., laptop 115 with wireless 802.11a/b/g/n capabilities) may connect to a private network provided by gateway 111, while a second device (e.g., wireless device 116) may connect to a public Wi-Fi hotspot provided by gateway 111.

Gateway 111 may include, or be communicatively coupled to, a modem component for encoding and decoding data transmissions. Gateway 111 may include, for example, a modem for providing Internet services (e.g., device 110, broadband modems, cable modems, wireless modems), voice communications equipment (e.g., embedded multimedia terminal adapter, embedded digital voice adapter, Voice-over-IP, terminal adapters), or any other suitable device or combination of devices. For example, gateway 111 may include device 110 for receiving data from and transmitting data to local office 103 over a CATV or MSO network.

Gateway 111 may include, or be communicatively coupled to, a wireless communications component for wirelessly receiving data from and wirelessly transmitting data to devices 112, 113, 114, 115, 116 and 117, as well as to other gateways and devices communicatively coupled to network 100. The wireless communications component may operate using conventional wireless technologies, such as Wi-Fi and WiMAX. For example, the wireless communications component may use different physical layer technologies, broadcast on different channels, or provide different local area networks (LANs), wireless local area networks (WLANs), or virtual local area networks (VLANs).

Gateway 111's wireless communications component may include, or be communicatively coupled to, one or more antennas for transmitting and receiving wireless communications. For example, gateway 111 may include an omnidirectional antenna for broadcasting in and receiving data from all directions within a wireless broadcasting range (e.g., 100 meters) of the antenna. In another example, gateway 111 may include a directional, high gain antenna for preferentially broadcasting in and receiving data from a particular direction within a wireless broadcasting range (e.g., 150 meters in a particular horizontal direction) of the antenna. In certain implementations, the wireless broadcasting range may vary with frequency band. For example, a wireless network broadcast in a 2.4 GHz frequency band may have a greater wireless broadcasting range than a wireless network broadcast in a 5 GHz frequency band.

In some embodiments, gateway 111 may include both a modem component and a wireless communications component. Such a fully-integrated device may allow bi-directional data communication with local office 103 and devices 112, 113, 114, 115, 116, 117 and any other suitable device or network. In other embodiments, the modem component, the wireless communications component, or both may be located in devices separate or remote from gateway 111. For example, the modem component may be located outside a user's home in an optical network terminal (ONT), while the wireless communications component may be located with a wireless antenna in a different location in the user's home than gateway 111. In other embodiments, both the modem component and wireless communications component may be located outside the user's home, but still provide Internet access to the user's devices. In certain implementations, a service provider may provide a modem component and various other components, while a user may provide a wireless communications component.

Network 100 may include various communications access points for wirelessly transmitting data to and receiving data from various devices. In certain implementations, the communications access points may be communicatively coupled to local office 103 through one or more networks 109 or directly through communication links 101. For example, network 100 may include communications access point 120 for allowing devices to communicate with local office 103, one or more external networks 109, and other devices communicatively coupled thereto. Communications access point 120 may be any suitable computing device for providing a wireless communications network in a wireless coverage area and communicating with devices, local office 103, one or more external networks 109, or any other suitable device or network. For example, communications access point 120 may be a telecommunications tower, a wireless communications tower, a broadcast communications tower, a communications satellite, a cellular repeater, a wireless access point, a wireless antenna, a gateway interface device (e.g., gateway 111), or any other suitable device or combination of devices. In another example, communications access point 120 may be included in an in-building distributed antenna system (DAS), an outdoor DAS, a rooftop DAS, or any other suitable communications system.

In some embodiments, communications access point 120 may include some or all of the features discussed with reference to gateway 111. For example, communications access point 120 may include, or be communicatively coupled to, an antenna, a modem component, a wireless communications component, device 110, or any other suitable component or combination of components for transmitting and receiving wireless communications. In one example, communications access point 120 may include an omnidirectional antenna for broadcasting in and receiving data from all horizontal directions within a wireless communications range (e.g., 2 miles). In another example, communications access point 120 may include a directional, high gain antenna for preferentially broadcasting in and receiving data from a particular direction within a wireless communications range (e.g., 5 miles in a particular horizontal direction). In certain implementations, the wireless broadcasting range may vary with frequency band.

In an illustrative example, communications access point 120 may increase its transmission power under certain conditions to extend the transmission range. In another example, communications access point 120 can increase the transmission range by changing the modulation scheme to reduce the number of phases or amplitudes used for a selected frequency and gain an effective signal-to-noise ratio increase which may be used to increase the reach of the signal. Communications access point 120 and the mobile device may each change modulation as necessary. In another example, communications access point 120 may increase the transmission range by increasing the error protection for the selected frequency to gain an effective signal-to-noise ratio increase which may be used to increase the reach of the signal. The error protection may be, for example, the amount of redundancy added to a digital transmission and may be used to determine how many lost bits may be recovered when the signal is weak. Communications access point 120 and the mobile device may each change error protection as necessary. In some embodiments, the techniques described herein may be combined to provide a greater transmission range.

In some embodiments, communications access point 120, gateway 111 or both may serve as a wireless access point for providing various wireless networks to devices. In certain implementations, the wireless communications networks may have different service level agreements (SLAs), which may result in different byte limits, allocated bandwidths, authentication/encryption processes, or any other suitable processes or parameters. The wireless communications networks may be public wireless networks, private wireless networks, or any other suitable wireless networks now known or later developed. For ease of discussion, wireless access points and wireless communications networks will hereinafter be discussed with reference to communications access point 120.

In some embodiments, communications access point 120 may provide a public wireless network whose resources are reserved for the use of a service provider or a lessee of communications access point 120. For example, a public wireless network may be implemented as a wireless hotspot through which wireless devices may connect to the Internet. In certain implementations, a group of connected hotspots (e.g., a wireless community network, a lily pad network) may allow devices to stay continuously or semi-continuously connected to the Internet while moving from one location to another location.

In some embodiments, communications access point 120 may provide a private wireless network with restricted access to pre-authorized devices, or a wireless network whose resources are reserved for the use of the owner of a home in which the wireless network resides. For example, a private wireless network may be implemented as a wireless or virtual LAN.

In some embodiments, communications access point 120 may wirelessly broadcast network identifiers, such as service set identifiers (SSIDs), for one or more of the wireless networks it provides. For example, communications access point 120 may broadcast a public wireless network identifier (e.g., an SSID) to all devices within wireless broadcasting range. In another example, communications access point 120 may not broadcast network identifiers for one or more of the wireless networks it provides. In another example, communications access point 120 may only broadcast network identifiers to particular devices, such as devices specified by local office 103 (e.g., subscribers to a cellular broadband service, third-party subscribers). For example, communications access point 120 may communicate with devices configured to identify a particular network identifier without actively broadcasting the network identifier to unknown devices.

In some embodiments, communications access point 120 may grant a request from a device to connect to its wireless network in accordance with its authentication requirements. For example, communications access point 120 may store an authentication table or a MAC address filter in local memory and grant a device access to a wireless network after determining that the device is authorized to access the network (e.g., using the device's MAC address transmitted in a request to connect to the network). In another example, communications access point 120 may receive authorization from local office 103 to grant a device access to a wireless network. In another example, the user of the device may input a username and password that is compared against a secure data store of authorized usernames and respective passwords to determine whether the device is authorized to access the network. In another example, the device may transmit a pre-shared key that is compared against a secure data store of pre-shared keys to determine whether the device is authorized to access the network.

In some embodiments, communications access point 120, local office 103 or both may manage bandwidth allocation statically, dynamically, or both based on the demand of each device. For example, communications access point 120 may manage quality of service (QoS) and allocate bandwidth so that predetermined services may be provided to the device. In certain implementations, a device may be initially allocated a fixed amount of bandwidth based on the particular device's requirements (e.g., applications running on the device) and additional bandwidth may be dynamically allocated to provide predetermined service levels and QoS. If numerous devices connect to communications access point 120 and it is not possible to allocate the minimum bandwidth for a device (e.g., by reducing the communications data rate for devices that have exceeded a threshold limit), then the device may be rejected permission to connect to communications access point 120.

In some embodiments, communications access point 120 may negotiate bandwidth to ensure that the desired QoS and bandwidth are available to each wireless network. For example, communications access point 120 may negotiate bandwidth to ensure that the desired QoS and bandwidth are available to wireless networks sharing a common backhaul connection to the Internet. In another example, communications access point 120 may negotiate bandwidth to prevent a single device from consuming all or most of the network's bandwidth. In certain implementations, local office 103 may provide rules, instructions, or both to communications access point 120 for bandwidth allocation and QoS requirements. For example, these rules may guide the allocation of bandwidth at a granular level (e.g., a session level, a device level) and indicate that some applications may have higher priority than others (e.g., emergency services such as E911 may have top priority).

In some embodiments, the coverage area of wireless networks coupled to network 100 may be extended to provide network coverage in areas where coverage was not previously available. The coverage area of the wireless network may be extended in various ways in accordance with various embodiments of the disclosure. For example, a wireless network provided by communications access point 120 may be extended by reallocating network resources, altering the wireless coverage area in which the network is provided, switching wireless services (e.g., to avoid data roaming charges), or performing any other suitable technique to maintain the wireless connectivity of a device. In certain implementations, communications access point 120, local office 103, or both may automatically extend the coverage of the wireless network as a device approaches a location where the wireless network is not presently available (e.g., a dead zone). Communications access point 120, local office 103, or both may determine that a device is nearing a dead zone by, for example, detecting a decrease in wireless signal strength, determining that the device is located at a location within a predetermined range (e.g., 500 meters) of the perimeter of the wireless coverage area provided by communications access point 120, or using any other suitable technique.

In some embodiments, communications access point 120, local office 103 or both may dynamically extend or reallocate the coverage area of a wireless network based on respective location information. Location information may indicate, for example, the geographic coordinates (e.g., latitude, longitude, altitude) of the device, the address of the user of the device, the direction of travel of the device, the speed of travel of the device, predicted locations of the device at future points in time, location accuracy, or any other suitable information. In certain implementations, location information may be determined by processing information received from or associated with the device, such as Global Positioning System (GPS) information, cellular tower triangulation information, wireless signal strength, and time of arrival of a wireless signal. In certain implementations, location information may include data determined from historical location information. For example, location information may include geographic locations at which the device is most frequently located (e.g., a list of the most common geographic locations over the past year), average geographic locations at particular times of the day or year, average travel speeds and routes (e.g., to differentiate between walking and driving). In another example, radio-frequency identification (RFID) information may be used. For example, a vehicle may include an RFID receiver for reading RFID information associated with roadside mile markers. The RFID information may then be transmitted to the appropriate processor for use in determining location information. Example location information data structures are discussed in further detail with reference to FIGS. 5 and 6.

In some embodiments, communications access point 120, local office 103 or both may predict or estimate where the client or device may be located at some time in the future. For example, local office 103 may analyze changes in the geographic location of a particular device to determine or estimate where the device will be located. Changes in the location of the device may be determined by changes in the geographic location of the device at different points in time. For example, local office 103 may predict where the device will be located at some time in the future based on the device's present geographic location and the device's rate and vector of travel. In another example, local office 103 may process the location information associated with a device to determine that the device is primarily located a first set of geographic coordinates, but frequently travels to a second set of geographic coordinates at a particular speed using a particular route. Local office 103 may determine that the device will be located at the second set of geographic coordinates based on changes in the geographic location of the device that indicate that the device is traveling towards the second set of coordinates or traveling along the particular route.

In one illustrative, non-limiting example, a vehicle may relay current fuel consumption information (e.g., the vehicle is consuming 21 miles per gallon of fuel) and the current amount of fuel remaining (e.g., 12 gallons of fuel remaining in the vehicle's fuel container). Local office 103 may use the current fuel consumption information and current amount of fuel remaining to determine the distance remaining until the vehicle's fuel container will be empty or near empty and the distance to the nearest fuel station. Local office 103 may also access the user's preferred fuel station based on any suitable user preference information, such as owning a fuel company's credit card. With the combination of this information, local office 103 may determine where the user may go to refuel and provide the wireless network at that location. Local office 103 may also use similar techniques with respect to meal information (e.g., it is near lunch time, the user prefers a particular restaurant, the particular restaurant is located at location X, provide the wireless network at location X).

In some embodiments, communications access point 120, local office 103, or both predict or estimate where a device will be located at some time in the future based on advance knowledge of a geographic route of travel associated with a user of the device. A user's geographic route may be identified or determined based on travel information associated with a user of a device, such as social media information, calendar information, electronic communication information, and user preference information.

Social media information may be, for example, a post, communication, or status update associated with the user's various social media accounts (e.g., Facebook, Foursquare, Twitter, Google, etc.). For example, local office 103 may search information included in a user's social media accounts to identify information indicating that the user will be traveling to a particular location at a particular date and time (e.g., a Washington, D.C.-based user post that states "Philadelphia today around 7pm").

Calendar information may be, for example, a user's or organization's events and schedules maintained by a local calendar (e.g., on the user's device) or a remotely stored calendar (e.g., an online calendar). For example, local office 103 may search information included in an electronic calendar to identify an event indicating that the user will be traveling to a particular location at a particular date and time (e.g., an event scheduled at a conference center, a scheduled job interview in New York City, user changes to the calendar's city, region, and/or time zone).

Electronic communication information may be, for example, an email, a transcription of a phone call or video chat (e.g., using a speech-to-text program). For example, local office 103 may search information included in an electronic communication (e.g., e-mail message, travel itinerary, hotel reservation, etc.) to identify information indicating that the user will be traveling to a particular location at a particular date and time (e.g., an email or IP phone call in which the user states "I will be driving to Kentucky tomorrow").

User preference information may be, for example, information associated with the user's wireless communications account, such as the user's address, city, region, time zone, zip code, devices (e.g., a list of MAC addresses, cell phone numbers, etc.), associated users (e.g., family members, friends), viewing preferences, and any other suitable information. For example, the local office may identify a change in a user's preferences to identify information indicating that the user will be traveling to a particular location at a particular date and time (e.g., a change to a different city in a weather application, a change to the user's address, a change to the zip code for which the user receives local news, etc.).

In some embodiments, the user of the device may provide his or her route of travel to the service provider (e.g., via local office 103) in advance of or during travel to maintain wireless connectivity along the route. For example, the user may communicate his or her travel plans to the service provider using email, phone call, text message, instant message, live chat, or any other suitable technique. In another example, local office 103 may have access to destinations included in user preference information such as a user's preferred hotels, fuel stations, restaurants, hobbies, clothing stores, or any other suitable information. If it is determined that the user or the user's device is located within a particular distance of such a destination, local office 103 may provide or prepare to provide the wireless network at that destination so that the wireless network is available should the user travel to that destination.

In an illustrative example, a user may be driving from Virginia to Kentucky. The user's route may pass through the mountains of West Virginia where dead zones (e.g., areas with no wireless network availability or coverage) may exist. Local office 103 may receive, store, or determine the user's travel plans or schedules by receiving travel information directly from the user or by analyzing the device's location information, the user's social media information, calendar information, electronic communication information, or user preference information, or any other suitable information or combination of information. Based on prior knowledge of the user's travel plans or schedules, local office 103 may know that the user will encounter a loss or reduction in signal strength due to a dead zone around Shady Spring, West Virginia. As the user approaches Shady Spring, local office 103 may instruct communications access point 120 to extend its wireless coverage area to provide the wireless network to the user's device, thereby reducing the possibility of a loss of service.

In some embodiments, a communications access point (e.g., access point 120), local office 103, or both may extend the coverage area of the wireless network by dynamically changing the power, direction, or both of the wireless network provided by communications access point 120 (e.g., by changing the direction, gain, or any other suitable parameter of communications access point 120's wireless antenna). For example, as the user approaches the edge of a wireless coverage area, communications access tower 120 may detect a change in signal strength and begin to increase its transmission power, which may extend the network's wireless coverage area. In another example, communications access point 120 may determine that the user's device is moving and has reached a location within a predetermined range (e.g., 500 meters) of the perimeter of its wireless coverage area and change the gain, direction, or both of its wireless antennas to extend the coverage area of wireless network in the user's direction of travel. As the user enters into the wireless coverage of another communications access point, communications access point 120 may transmit an instruction to the user's device to transfer to the wireless network provided by the other communications access point and communications access point 120 may begin to power down or otherwise restore the wireless network to its previous wireless coverage area. The predetermined range may be based on, for example, the particular technology used (e.g., a 4G wireless network may have a longer range than a Wi-Fi wireless network). Communications access point 120 may also dynamically adjust the range based on the various technologies to which the user may be transitioning. For example, if the user is on a 4G wireless network and is going to travel to another 4G wireless network, the current 4G wireless network may extend the transition range to the particular value at which the user's device may be picked up by the other 4G wireless network. In another example, if the transition is from a 4G wireless network to a Wi-Fi wireless network, the current 4G wireless network may extend the transition range to a greater value to ensure that user's device makes the transition to the Wi-Fi wireless network. In certain implementations, the range may also be based on the user's relationship with the provider of the wireless network.

In some embodiments, communications access point 120, local office 103 or both may extend the coverage area of the wireless network by concentrating the wireless network in a particular wireless coverage area. For example, local office 103 may cause a communications access point or a group of communications access points to concentrate their wireless coverage areas in a particular direction or geographic area based on location density information for a population of devices or users (e.g., wireless subscribers). Location density information may include, for example, the respective geographic locations of users such as client devices connected to the wireless network or located in the network coverage area, location information for users such as client devices with access to the wireless network, geographic areas with the highest number of users, geographic areas with the highest bandwidth consumption, geographic areas with the lowest number of users, geographic areas with the lowest bandwidth consumption, the geographic locations and wireless coverage areas of other communications access points, and any other suitable information. In an illustrative example, if a wireless network is provided by a plurality of access points, such as cellular communications towers, located around the periphery of Philadelphia, Pa., local office 103 may redirect the power of the towers towards Philadelphia because it has a higher population density of devices. In another illustrative example, the population density of a stadium, arena, or concert hall may be very high when an event is going on and very low when an event is not going on. When an event is going on, local office 103 may redirect the power of nearby communications towers to form a concentrated network coverage area at the stadium, arena, or concert hall. Example data structures for use in determining location density information are discussed in further detail with reference to FIGS. 5 and 6.

Extending the coverage area of the wireless network based on location density information may provide a more robust use of energy in cases where the wireless network is needed in a particular region and may reduce the necessity to add more communications towers as well as reduce the energy inefficiencies caused by spherically extending wireless coverage areas. Location densities may be modeled automatically based on the number of devices communicating on the network at a particular time and wireless coverage may be extended to an area with increased traffic as needed (e.g., when network traffic exceeds a predetermined threshold). For example, local office 103 may redirect network resources based on the needs and measured migration patterns of devices in general. In another example, additional coverage may be provided to airports during peak travel times. In another example, systems that use multiple antenna arrays may determine that the majority of the calls originate from particular coordinates such as polar coordinates (200, 20') through (265, 183'). In this case, local office 103 may reduce the power provided to the antennas located outside these coordinates and increase the power provided to the antennas located within these coordinates. Similarly, triangulation information, GPS coordinates, or both may also be used.

In some embodiments, communications access point 120, local office 103 or both may extend the coverage area of the wireless network by transferring services to another wireless network. For example, communications access point 120, local office 103, or both may transfer voice and data signals transmitted over one transport media (e.g., a cellular network) to another transport media (e.g., a satellite network, Wi-Fi, WiMAX). In certain implementations, communications access point 120 may transmit an instruction (e.g., based on data received from local office 103) to a device connected to its wireless network to transfer to a wireless network provided by another communications access point or gateway interface device. The transfer may be over different physical networks, such as MSO networks, pay TV networks, cellular networks, femtocell networks, Wi-Fi networks, WiMAX networks, satellite networks, or any other suitable networks. In certain implementations, the instruction may be transmitted across any or all networks to which the device is currently connected. For example, the device may be instructed to transfer from a cellular network to a Wi-Fi network. In another example, the device may be instructed to transfer from a wireless network provided over a CATV network to a wireless network provided over a cellular network. In another example, local office 103 may instruct the device to connect to a wireless network identified by an SSID broadcast from customer premise equipment located in a dead zone where the is or will be located. In certain implementations, communications access point 120, local office 103 or both may support seamless transition of the device between different wireless networks by, for example, providing session data to the new network connection.

In certain implementations, the transition may be based on protocols dependent on battery strength. For example, the device may transmit data indicative of its battery level to local office 103. Local office 103 may then use the battery level information to select a particular wireless network when multiple wireless networks are available. In an example, a user device may be located in an area that has both Wi-Fi and WiMAX networks, and the user device's battery may be in a state where transmitting to WiMAX will consume more power than Wi-Fi. Even though the user device may get more bandwidth on the WiMAX network, the user device may use the Wi-Fi network because the cost of battery consumption on the WiMAX network may be too high.

In some embodiments, communications access point 120, local office 103 or both may establish a communications link with the wireless network to which service is to be transferred before the service is transferred. In certain implementations, a handshake or other switching protocol may be performed with the new wireless network. As a result, both the device and local office 103 are aware of multiple available communications paths. For example, a device may receive instructions from local office 103 to initiate a handshake with a new wireless network identified and selected by local office 103. In certain implementations, a device such as a client device may be connected to a first wireless network provided by a first communications access point, which may overlap with the wireless coverage area of a second wireless network provided by a second communications access point. A handshake may be performed between the two wireless networks before it is needed (e.g., without the user of the device's knowledge). Subsequently, when the device has been instructed to transfer service from the first wireless network to the second wireless network, the transfer to the second wireless network may occur automatically when the device travels out of the first wireless network.

In some embodiments, multiple wireless networks may be available to a device at any given geographic location along a user's route. In such embodiments, communications access point 120, local office 103 or both may extend the coverage area of the wireless network by selecting the best wireless network for the device's use and instructing the device to transfer to the selected wireless network. For example, local office 103 may determine that multiple SSIDs are being broadcast in a dead zone along a user's geographic route. Local office 103 may analyze the wireless networks respectively associated with the SSIDs and select one of the wireless networks based on, for example, security requirements, available bandwidth, bandwidth capability (e.g., for maintaining transmission of an HD movie along the device's route), data rate, wireless signal strength, the device's route or direction or travel, the cost associated with using the network, the wireless coverage area of the network (e.g., larger coverage areas may increase the possibility of maintaining coverage for a longer duration), or any other suitable factor or consideration. In one example, local office 103 may transmit an instruction to the device as an ordered table of priorities for all of the available networks and the device may attempt connections in that order. In another example, the user device may be located in an area where Wi-Fi is available from two or more providers. Local office 103 may have an agreement with one of the providers that allows the user to use that provider's service for free or at a reduced rate. As a result, the device may be instructed to select that provider's Wi-Fi network.

In some embodiments, local office 103 may cause communications access point 120 to transmit an instruction to the device to transfer to the selected wireless network as the device nears the dead zone (e.g., as determined by reaching a location within a predetermined range of the perimeter of the wireless coverage area for the wireless network to which it is connected). In another example, local office 103 may cause communications access point 120 to transmit an instruction to the device to search for a new wireless network and automatically request to connect to the new wireless network once a compatible network is identified or a preferred network is selected. In certain implementations, the device, communications access point 120, or both may transmit active session data to the new wireless network for session handoff.

In some embodiments, the coverage area of the wireless network may be extended by moving cached data from one server to another server along a user's travel route. For example, communications access point 120 may transmit media content to a device from content server 106, which may be a cache server in a content delivery network. In advance of a device transferring service to a new wireless network, for example, local office 103 may determine if another cache server in the content delivery network has a shorter communications path (e.g., shorter physical distance, higher available bandwidth, greater transmission speed, fewer intermediate nodes or servers) to the communications access point which provides the new wireless network. If so, local office 103 may automatically move the cached media content to the other cache server having the shorter communications path. By moving cached media content to different locations along a user's route, the user's device may receive cached data at a higher data transmission rate at any location (e.g., as in a cloud computing environment).

While the above examples are illustrated using communications access point 120, similar concepts may be applicable to other components of network 100. For example, gateway 111 may dynamically increase power in a particular direction as a user's wireless device 116 moves from a location inside the user's home 102a to a location outside the user's home 102a, such as a location in the user's backyard. Various techniques for extending or reallocating the wireless coverage area of a wireless network will be discussed in further detail with reference to FIGS. 3 and 4.

Figure 2:
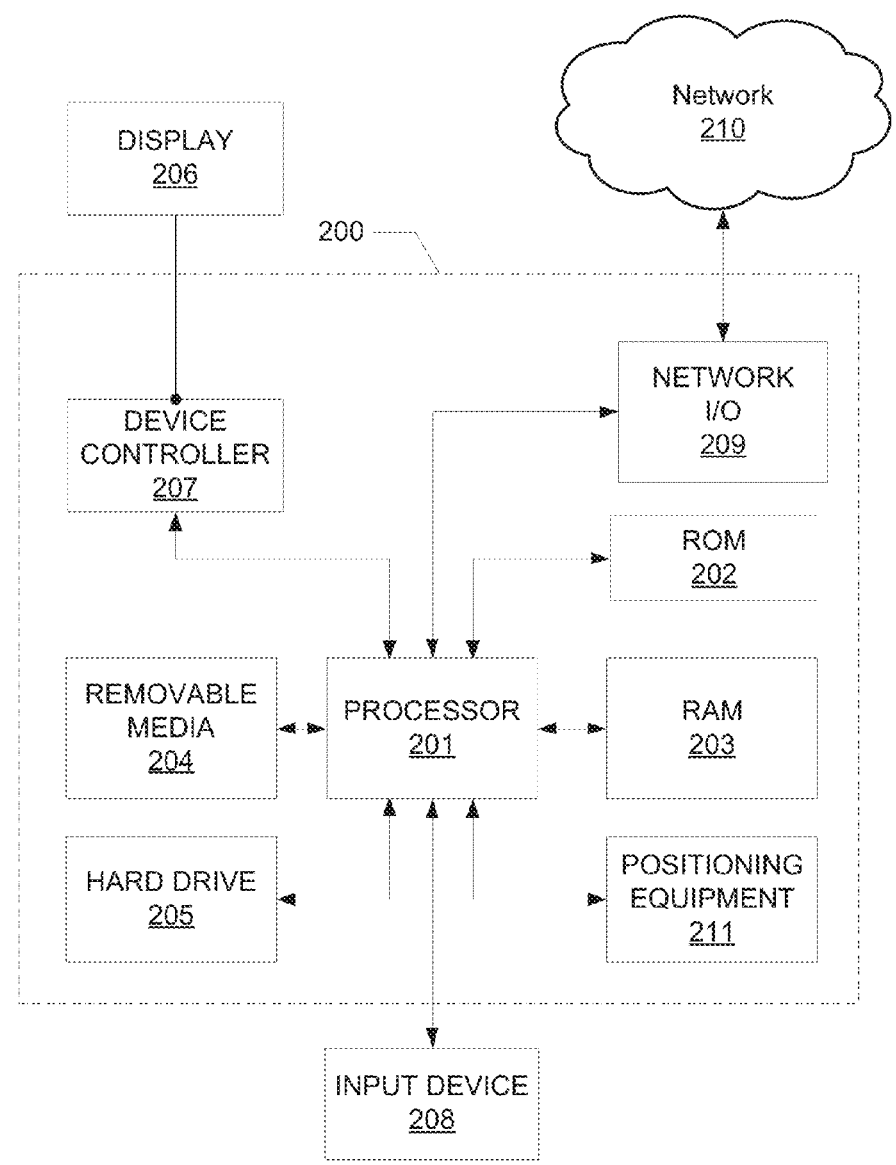
FIG. 2 illustrates an example hardware and software platform on which various elements described herein may be implemented.

FIG. 2 illustrates general hardware and software elements of a computing device that may be used to partially or wholly implement any of the various devices and components described herein. Device 200 may include one or more processors 201, which may execute instructions of a computer program to perform any of the features described herein. The instructions may be stored in any type of computer-readable medium or memory to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), hard drive, floppy disk drive, or any other desired electronic storage medium. Instructions may also be stored in hard drive 205, which may be an internal or external hard drive.

In some embodiments, device 200 may include one or more output devices, such as a display 206 (e.g., an external monitor or television) and may include one or more output device controllers 207, such as a video processor. In some embodiments, device 200 may include one or more user input devices 208, such as a remote control, keyboard, mouse, touch screen, microphone, or any other suitable input device.

In some embodiments, device 200 may include one or more network interfaces, such as input/output (I/O) interface 209 (e.g., a network card), for communicating with external network 210. Interface 209 may be a wired interface, a wireless interface, or both. In certain implementations, interface 209 may include a modem (e.g., a cable modem), and network 210 may include communication links 101 shown in FIG. 1, one or more external networks 109, an in-home network, a provider's wireless, coaxial, fiber, or hybrid fiber/coaxial distribution system (e.g., a DOCSIS network), or any other desired network.

In some embodiments, device 200 may include one or more geographic positioning or location determination devices, such as positioning equipment 211. Positioning equipment 211 may include any suitable hardware (e.g., a processor) and memory for determining the present or predicted geographic location of device 200 or another device. In certain implementations, positioning equipment 211 may be used to determine location information for a particular device, location density information for a group of devices, or both.

Figure 3:
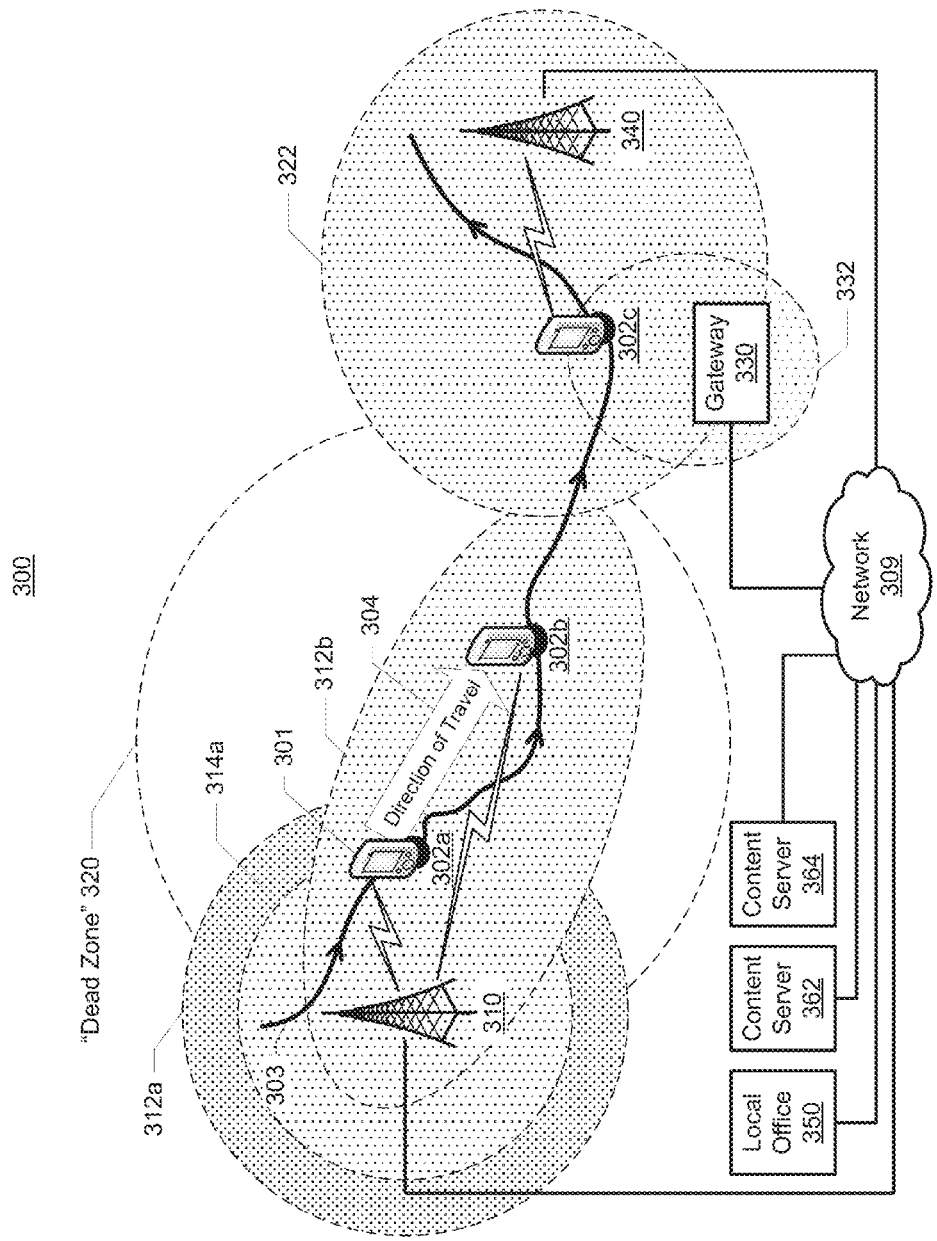
FIG. 3 illustrates an example network environment for extending coverage.

FIG. 3 illustrates an example network environment 300 whose wireless coverage area may be extended to provide wireless coverage in areas where wireless coverage was limited or not previously available. Environment 300 is only one example of a suitable network environment and is not intended to suggest any limitation as to the scope of use or functionality of the disclosure. The illustrated network environment should not be interpreted as having any dependency or requirement relating to any one or combination of components in a wireless network environment.

Example network environment 300 includes a device 301 communicatively coupled to a wireless network. In some embodiments, device 301 may include any suitable combination of features described with reference to devices 116 and 117 shown in FIG. 1, device 200 shown in FIG. 2, or any other suitable component. For example, device 301 may be a tablet computer, a cellular phone, an automotive multimedia system, or any other suitable computing device. device 301 may be located at various geographic locations at various points in time. For example, device 301 may be located at a first location (e.g., location 302a) at a first point in time. Subsequently, device 301 may be travelling to a second location (e.g., location 302b) at a later point in time. In certain implementations, the second location may be a location along the route of travel (e.g., route 303) of device 301. Route 303 may be any suitable geographic route, thoroughfare, or way for traveling from one geographic location to another geographic location. For example, route 303 may be a combination of different roads and highways, or a route taken by a commercial transportation vehicle such as an airplane, train or bus. In certain implementations, the second location may be a location along the direction of travel (e.g., vector 304) of device 301. Vector 304 may be any suitable geographic vector or combination of vectors and may be determined by, for example, processing the present and historical geographic locations of device 301, location information associated with device 301, or any other suitable information. In certain implementations, location 302b, route 303, or vector 304 may include approximate (e.g., predicted, estimated) geographic locations and may be different from the actual geographic location of device 301 at any particular point in time.

In some embodiments, communications access point 310 may provide a wireless network within a wireless broadcasting range indicated by wireless coverage area 312a. Communications access point 310 may include any suitable combination of features described with reference to communications access point 120 shown in FIG. 1, device 200 shown in FIG. 2, or any other suitable component. For example, communications access point 310 may be a Wi-Fi hotspot or a cellular communications tower operated by local office 350 via an indirect communications path through network 309. Local office 350 may include any suitable combination of features described with reference to local office 103 shown in FIG. 1, device 200 shown in FIG. 2, or any other suitable component. Network 309 may include any suitable combination of features described with reference to network 109 shown in FIG. 1. The components shown in FIG. 3 may communicate through direct communications links or may communicate via indirect communications paths through network 309. Detailed communications paths and links are not shown in FIG. 3 to avoid overcomplicating the figure.

In some embodiments, communications access point 310, local office 350, or both may monitor device 301 to determine whether device 301 is moving towards or away from areas where wireless coverage is not available (e.g., "dead zone" 320). For example, device 301 at location 302a may be communicatively coupled to the wireless network provided in wireless coverage area 312a. Communications access point 310, local office 350, or both may determine that device 301 is traveling towards "dead zone" 320 and will arrive at location 302b at some time in the future. For example, communications access point 310, local office 350, or both may predict that device 301 will be located at location 302b based on advance knowledge of route 303, vector 304, location information associated with device 301, or any other suitable information or combination of information.

In some embodiments, communications access point 310, local office 350 or both may predict the future locations of device 301 and extend network coverage to the predicted location. For example, communications access point 310, local office 350, or both may predict that device 301 is moving from location 302a to a location in "dead zone" 320, such as location 302b, at some point in the future based on route 303, vector 304, location information associated with device 301, or any other suitable information. Based on the prediction, communications access point 310 may extend the wireless coverage area of the wireless network to form wireless coverage area 312b to cover the area through which the user is predicted to travel. Wireless coverage area 312b may be formed by, for example, changing the direction, gain, or any other suitable parameter of a wireless antenna of communication access point 310. As a result, device 301 at location 302b may be communicatively coupled to a wireless network provided in wireless coverage area 312b by communications access point 310. In another example, as device 301 approaches the perimeter of wireless coverage area 312a, communications access point 310 may detect a change in signal strength and begin to increase its transmission power, which may extend the network's wireless coverage area into "dead zone" 320. In another example, communications access point 310 may determine that device 301 is moving and has reached a location within a predetermined range of the perimeter of wireless coverage area 312a (e.g., a location in area 314a). As a result, communications access point 310 may extend its wireless coverage area to form wireless coverage area 312b.

In certain implementations, communications access point 310, local office 350 or both may extend the coverage area of the wireless network by using existing services that are within communications range of communications access point 310 or directly coupled to communications access point 310. For example, if an MSO that operates communications access point 310 does not have a communications access point in "dead zone" 320, device 301 may access another MSO's communications access point. In certain implementations, wireless transmissions of device 301 may be transported from a cellular network to Wi-Fi, WiMAX, satellite, or any other suitable network or combination depending on network availability and other suitable factors. For example, when device 301 is located in a dead zone where no cellular network is available, it may transfer to a WiMAX, satellite, or even Wi-Fi network to maintain coverage. Once device 301 is no longer located in the dead zone and cellular coverage is available, the communication access point 310 restores its wireless network to wireless coverage area 312a.

In some embodiments, communications access point 310, local office 350 or both may extend the coverage area of the wireless network by transferring services to another wireless network, such as a wireless network provided by communications access point 340. Communications access point 340 may include any suitable combination of features described with reference to communications access point 310 and may provide a wireless network within a wireless broadcasting range indicated by wireless coverage area 322. As device 301 approaches the end of "dead zone" 320 and enters into wireless coverage area 322 provided by communications access point 340 (or the extended range capabilities of communications access point 340), communications access point 310 may transmit an instruction to device 301 to transfer service to the wireless network provided by communications access point 340. As a result, device 301 at location 302c may be communicatively coupled to the wireless network provided in wireless coverage area 322 by communications access point 340. Subsequently, communications access point 310 may begin to power down or otherwise restore its wireless network to wireless coverage area 312a. In certain implementations, device 301, communications access point 310, or local office 350 may transmit active session data to the new wireless network for session handoff.

In certain implementations, communications access point 310, local office 350 or both may predict the future location of device 301, search for a second wireless network at the predicted location, and perform a handshake with the second wireless network before the device arrives at the predicted location. For example, communications access point 310, local office 350 or both may predict that device 301 will likely be located at location 302c (which is outside the extended range capabilities of communications access point 310) at some point in the future, search for wireless networks available at location 302c, identify a wireless network provided by communications access point 340, and perform a handshake with the wireless network provided by communications access point 340 before device 301 arrives at location 302c. Communications access point 310, local office 350 or both may transmit an instruction to device 301 to transfer to the identified wireless network information while it is still connected to the wireless network provided by communications access point 310. Subsequently, device 301 may search for the wireless network in the instruction and preemptively establish a connection with the identified network. Once connected, device 301, local office 350 or both may initiate the handshake with the new wireless network. As a result, when device 301 reaches location 302c, it may automatically transfer to the wireless network provided by communications access point 340.

In certain implementations, if device 301 has been disconnected from one wireless network but is within the extended range capabilities of another wireless network, the communications access point providing the other wireless network may dynamically extend its wireless coverage area so that the device may be permitted to connect to the other wireless network. For example, if device 301 at location 302b is disconnected from the wireless network provided by communications access point 310 but is within the extended range capabilities of communications access point 340, communications access point 340 may dynamically extend its wireless coverage area so that device 301 may connect to its wireless network.

In some embodiments, multiple wireless networks may be available to device 301 at any given geographic location along route 303. In such embodiments, the coverage area of the wireless network may be extended by selecting the best wireless network for use of device 301 and instructing device 301 to transfer to the selected wireless network. For example, device 301 at location 302c may be within wireless coverage area 322 provided by communications access point 340 and wireless coverage area 332 provided by gateway 330. Gateway 330 may include any suitable combination of features described with reference to gateway 111, communications access point 120, and local office 103 shown in FIG. 1, and device 200 shown in FIG. 2. For example, gateway 330 may be a gateway interface device that provides a residential wireless access point, a Wi-Fi hotspot, or any other suitable service. In certain implementations, local office 350 may analyze the wireless networks respectively provided by communications access point 340 and gateway 330 and select one of the wireless networks based on, for example, security requirements, available bandwidth, ability of device 301 to access the wireless networks, or any other suitable technique. For example, the wireless network provided by communications access point 340 may be selected because it has greater network coverage at predicted future locations along route 303. In another example, the wireless network provided by gateway 330 may be selected because the MAC address of device 301 is included in a MAC address filter implemented by gateway 330. In certain implementations, local office 350 may cause communications access point 310 (or communications access point 340) to transmit an instruction to device 301 to transfer to the selected wireless network.

In some embodiments, the coverage area of the wireless network may be extended by moving or copying cached data from one server to another server along a user's travel route. In an illustrative example, communications access point 310 may transmit media content to device 301 from content server 362. Content server 362 may include any suitable combination of features described with reference to content server 106 shown in FIG. 1 and device 200 shown in FIG. 2. For example, content server 362 may be a cache server in a content delivery network. In advance of a device transferring service to the wireless network provided by communications access point 340, local office 350 may determine that content server 364 (e.g., another cache server in the content delivery network which may include any suitable combination of features described with reference to content server 362) has a shorter communications path (e.g., shorter physical distance, higher available bandwidth, greater transmission speed, fewer intermediate nodes) to communications access point 340 than content server 362. In advance of device 301 transferring service to communications access point 340, the content may be automatically moved or copied from content server 362 to content server 364. In another example, if it is determined that device 301 will transfer to gateway 330, the content may be automatically moved or copied to a storage device in communication with gateway 330 (e.g., local memory associated with gateway 330, a DVR or set-top box coupled to gateway 330) in advance of the transfer.

Figure 4:
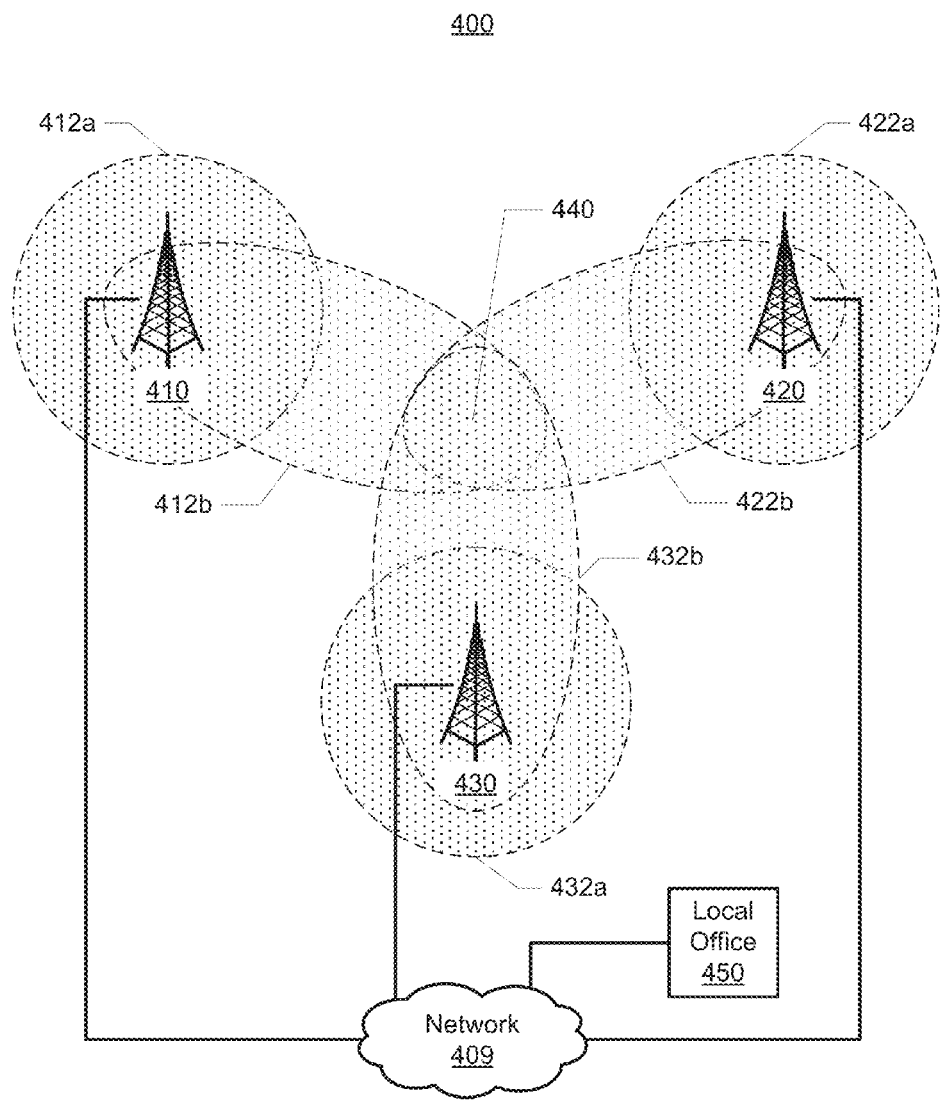
FIG. 4 illustrates another example network environment for extending coverage.

FIG. 4 illustrates an example network environment 400 in which the coverage area of a wireless network may be extended to concentrate wireless coverage in particular areas. Environment 400 is only one example of a suitable network environment and is not intended to suggest any limitation as to the scope of use or functionality of the disclosure. The illustrated network environment should not be interpreted as having any dependency or requirement relating to any one or combination of components in a wireless network environment.

Example network environment 400 may include any suitable number of communications access points or interface devices for providing a wireless network. For example, network environment 400 may include communications access point 410 that provides a wireless network in wireless coverage 412a, communications access point 420 that provides a wireless network in wireless coverage 422a, communications access point 430 that provides a wireless network in wireless coverage 432a. Communications access points 410, 420, and 430 may provide the wireless network in their respective wireless coverage areas. Communications access points 410, 420, and 430 may include any suitable combination of features described with reference to communications access point 120 shown in FIG. 1, device 200 shown in FIG. 2, communications access points 310 and 340 and gateway 330 shown in FIG. 3, or any other suitable component. For example, communications access points 410, 420, and 430 may be cellular communications towers operated by local office 450 via indirect communications paths through network 409. Local office 450 may include any suitable combination of features described with reference to local office 103 shown in FIG. 1, device 200 shown in FIG. 2, local office 350 shown in FIG. 3, or any other suitable component. Network 409 may include any suitable combination of features described with reference to one or more networks 109 shown in FIG. 1. In certain implementations, the components shown in FIG. 4 may communicate through direct communications links or may communicate via indirect communications paths through network 409. Detailed communications paths and links are not shown in FIG. 4 to avoid overcomplicating the figure.

In some embodiments, local office 450 may cause a communications access point or a group of communications access points to concentrate their wireless coverage areas in a particular direction or geographic area based on location density information for a population of devices in the network coverage area. For example, local office 450 may cause communications access points 410, 420, and 430 to concentrate their wireless coverage areas in a particular wireless coverage area, such as overlapping wireless coverage area 440. Overlapping wireless coverage area 440 may be formed, for example, by extending wireless coverage areas 412a, 422a, and 432a to form wireless coverage areas 412b, 422b, and 432b, respectively. In certain implementations, local office 450 may reallocate network resources to form overlapping wireless coverage area 440 based on the needs and migration patterns of devices and to accommodate dynamic changes in population or customer density in a geographic area. Overlapping wireless coverage area 440 may provide a wireless coverage area capable of accommodating various scenarios, such as an increase in bandwidth consumption or wirelessly-connected devices during a conference or other event, a decrease in bandwidth consumption in a particular region due to technological advances or mass migration, an increase or decrease in local network traffic during a particular time of year (e.g., summer or winter travel destinations), or any other suitable scenario.

FIG. 5 illustrates example information 500 that includes location information for devices, users, or both having access to various wireless networks. In some embodiments, information 500 may be, or may be used to determine, location density information for a population of devices or users. Information 500 may be a data structure stored in any suitable storage device, such as a memory of device 200 shown in FIG. 2, a database maintained by local office 103 shown in FIG. 1, a memory of communications access point 120, a memory of gateway 111, or in any other suitable storage device or combination of storage devices (e.g., in a cloud computing environment). In some embodiments, information 500 may be included in a user interface implemented by device 200 shown in FIG. 2. For example, information 500 may be viewed using display 206 shown in FIG. 2 and manipulated using input device 208 to add, remove, or edit information. In certain implementations, information 500 may be automatically manipulated by local office 103 shown in FIG. 1 without requiring user input.

Information 500 may include location information for a plurality of devices. Location information for respective devices may be included in location information rows 511-513, 521-523, 531-533, or in any other suitable field, grouping, data structure, or combination thereof. Each location information row may be associated with a respective communications access point identification (ID) field 501, communications access point location field 502, device identification (ID) field 503, device location field 504, signal strength field 505, and bandwidth consumption field 506. In an illustrative example, location information rows 511, 512, and 513 may refer to devices having access to a wireless network provided in wireless coverage area 412a by communications access point 410 shown in FIG. 4. Location information rows 521, 522, and 523 may refer to devices having access to a wireless network provided in wireless coverage area 422a by communications access point 420 shown in FIG. 4. Location information rows 531, 532, and 533 may refer to devices having access to a wireless network provided in wireless coverage area 432a by communications access point 430 shown in FIG. 4.

Communications access point identification field 501 may include, for example, address information (e.g., a unique identifier, a hardware address, a cell ID, a MAC address, an IP address, an access point name) for a communications access point or an intermediate device that respectively handles the communications access point's communications. Communications access point location field 502 may include the geographic location (e.g., latitude, longitude) of the communications access point identified in field 501. Device identification field 503 may include, for example, address information (e.g., a unique identifier, a hardware address, a MAC address, an IP address, a user name, a device name) for a device or an intermediate device that respectively handles the device's communications. Device location field 504 may include the geographic location (e.g., latitude, longitude) of the device identified in field 503.

In some embodiments, information 500 may include connection information for the communications access point identified in field 501, the device identified in field 503, or both. Connection information may include, for example, time of connection information (e.g., the date and time that the device identified in field 503 connected to the communications access point identified in field 501), connection duration, connection speed, signal quality, amount of data transmitted to a connected device, amount of data received from the connected device, averages based on historical connection information, or any other suitable information. For example, information 500 may include signal strength field 505 and bandwidth consumption field 506. Signal strength field 505 may include, for example, a Receive Signal Strength Indicator (RSSI), signal-to-noise-ratio (SNR), signal strength (e.g., in decibels), or any other suitable information indicative of the signal strength of the wireless connection between the device identified in field 503 and the communications access point identified in field 501. Bandwidth consumption field 506 may include, for example, a current, historical, or average bit rate of data transmissions between the device identified in field 503 and the communications access point identified in field 501. In certain implementations, bandwidth consumption field 506 may represent the bandwidth consumption as a percentage of the peak bit rate, channel capacity, or maximum throughput of the communications path between the device identified in field 503 and the communications access point identified in field 501.

In some embodiments, information 500 may include information for devices that are not connected to a wireless network. For example, the device identified in field 503 of location information row 532 may not be connected to a wireless network but may be associated with a user of a wireless service provided by local office 103 shown in FIG. 1. As a result, field 504 of location information row 532 may include the geographic location of the user's address and fields 501 and 502 may include information indicative of the nearest communications access point or the best communications access point for the device's use (e.g., as determined by local office 103 shown in FIG. 1).

In some embodiments, information 500 may be dynamically updated to indicate the current or predicted location information for one or more devices. For example, location information for devices may be added to information 500 by local office 103 shown in FIG. 1 when, for example, a device connects to a wireless network. In another example, local office 103 may update device location field 504 when, for example, a device moves to a different geographic location. In another example, location information may be removed from information 500 for a device that has disconnected from a wireless network or has not connected to a wireless network after a predetermined amount of time (e.g., 4 hours). In another example, the local office may update information 500 when, for example, a prediction or estimation is made that the device may be located at a different location at some future point in time. For example, information 500 may be updated at a predetermined frequency (e.g., every 30 days) based on historical usage data. In another example, information 500 may be updated in real-time or near real-time (e.g., every two seconds). In one example, information may be updated manually by a user using any suitable user interface. In another example, information may be updated based on user preference information, such as the user belonging to a subscription service that updates information based on various user preferences according to, for example, the user's geographic location and information provided by other users in the area. Updating information 500 with predicted or estimated location information is discussed further with reference to FIG. 6.

In some embodiments, information 500 may include more or less data fields than those illustrated. For example, information 500 may include location information that indicates a direction of travel of the device, a speed of travel of the device, predicted locations of the device, location accuracy, geographic locations or areas with the highest number of devices, geographic locations or areas with the highest bandwidth consumption, geographic locations or areas with the lowest number of devices, geographic locations or areas with the lowest bandwidth consumption, geographic locations and wireless coverage areas of other communications access points or any other suitable information or combination of information.

In some embodiments, information 500 may be represented visually in one or more maps, graphs, charts, or in any other suitable form. For example, information 500 may be used to generate a two-dimensional map showing the locations and bandwidth consumptions of various devices, the locations and wireless coverage areas of various communications access points, and "dead zones" where a wireless network is not available. The visual representation may be used as location density information by a local office, a user, or both to reallocate network resources (e.g., to alter one or more wireless coverage areas). The aforementioned additional information and visual representations are not shown in FIG. 5 to avoid overcomplicating the figure.

FIG. 6 illustrates example predicted location information 600 for a population of devices, users, or both. Information 600 may be a data structure stored in a storage device, such as a memory of device 200 shown in FIG. 2. In some embodiments, information 600 may include any suitable combination of features described with reference to information 500 shown in FIG. 5. For example, information 600 may include predicted or estimated location information for devices identified in field 503 shown in FIG. 5.

Information 600 may include predicted location information in respective predicted location information rows 611-613, 621-623, 631-633, or in any other suitable field, grouping, data structure, or combination thereof. Each location information row may be associated with a respective device identification field 603, predicted location field 604, predicted time of arrival field 607 (e.g., an estimated time that the device indicated in field 603 may arrive at the predicted location indicated in field 604), predicted signal strength field 605, and predicted bandwidth consumption field 606. In an illustrative example, the devices respectively identified in field 603 of location information rows 611, 612, 622, 623, 631, and 633 may be traveling to a predicted location indicated in field 604, such as a conference center located in area 440 shown in FIG. 4. As a result, local office 450 may extend the wireless coverage areas of communications access points 410, 420, and 430 to form overlapping coverage area 440 at a time corresponding to the earliest of the predicted times of arrival indicated in field 607 or an average of the predicted times of arrival indicated in field 607 weighted by the respective predicted bandwidth consumptions in field 606. In another illustrative example, location information row 613 may refer to a device that is traveling to a different location, such as a location northwest of the location indicated in field 504 of row 513 shown in FIG. 5. In another illustrative example, location information rows 621 and 632 may refer to devices that may not be moving to locations different from their respective locations indicated in field 504 of rows 521 and 532 shown in FIG. 5.

Device identification field 603 may include, for example, address information (e.g., a unique identifier, a hardware address, a MAC address, an IP address, a user name, a device name) for a device or an intermediate device that respectively handles the device's communications. For example, field 603 may include address information for devices identified in field 503 shown in FIG. 5. Predicted device location field 604 may include the predicted or estimated geographic location (e.g., latitude, longitude) of the device identified in field 603. Predicted time of arrival field 607 may include the predicted or estimate time that the device identified in field 603 may arrive at the predicted location indicated in field 604. Fields 604 and 607 may be based on any suitable information, such as changes in the device's geographic location, the device's direction and speed of travel, input received from a user of the device, advance knowledge of the user's route, social media information, calendar information, electronic communication information, user preference information, or any other suitable information.

In some embodiments, information 600 may include predicted or estimated connection information for the devices identified in field 603. For example, information 600 may include predicted signal strength field 605 and predicted bandwidth consumption field 606. Predicted signal strength field 605 may include, for example, a predicted RSSI, a predicted SNR, a predicted signal strength (e.g., in decibels), or any other suitable information indicative of the predicted signal strength of a wireless connection between the device identified in field 603 and a communications access point available at the predicted location and time indicated in fields 604 and 607, respectively. Predicted bandwidth consumption field 606 may include, for example, the predicted bandwidth consumption of the device identified in field 603 at the predicted location and time indicated in fields 604 and 607, respectively. The predicted bandwidth consumption may be based on, for example, the current bandwidth consumption of the device, the device's historical bandwidth consumption, an average of the device's historical bandwidth consumption information (e.g., over the past 30 days), input received from a user of the device, or any other suitable information. In certain implementations, predicted bandwidth consumption field 606 may represent the predicted bandwidth consumption as a percentage of the peak bit rate, channel capacity, or maximum throughput of the communications path between the device identified in field 603 and a communications access point available to the device at the location and time indicated in fields 604 and 607, respectively.

In some embodiments, information 600 may include more or less data fields than those illustrated. For example, information 600 may include predicted location information that indicates a predicted direction of travel of the device, a predicted speed of travel of the device, further predicted locations of the device at future points in time, predicted location accuracy, geographic locations or areas with the highest predicted number of devices, geographic locations or areas with the highest predicted bandwidth consumption, geographic locations or areas with the lowest predicted number of devices, geographic locations or areas with the lowest predicted bandwidth consumption, geographic locations and wireless coverage areas of other communications access points available at the respective predicted locations and times indicated in fields 604 and 607, or any other suitable information or combination of information.

In some embodiments, information 600 may be represented visually in one or more maps, graphs, charts, or in any other suitable form. For example, information 600 may be used to generate a two-dimensional heat map showing the predicted locations and predicted bandwidth consumptions of various devices at a future point in time. The visual representation may be used as predicted location density information by a local office, a user, or both to reallocate network resources (e.g., by altering one or more wireless coverage areas). The aforementioned additional information and visual representations are not shown in FIG. 6 to avoid overcomplicating the figure.

Figure 7:
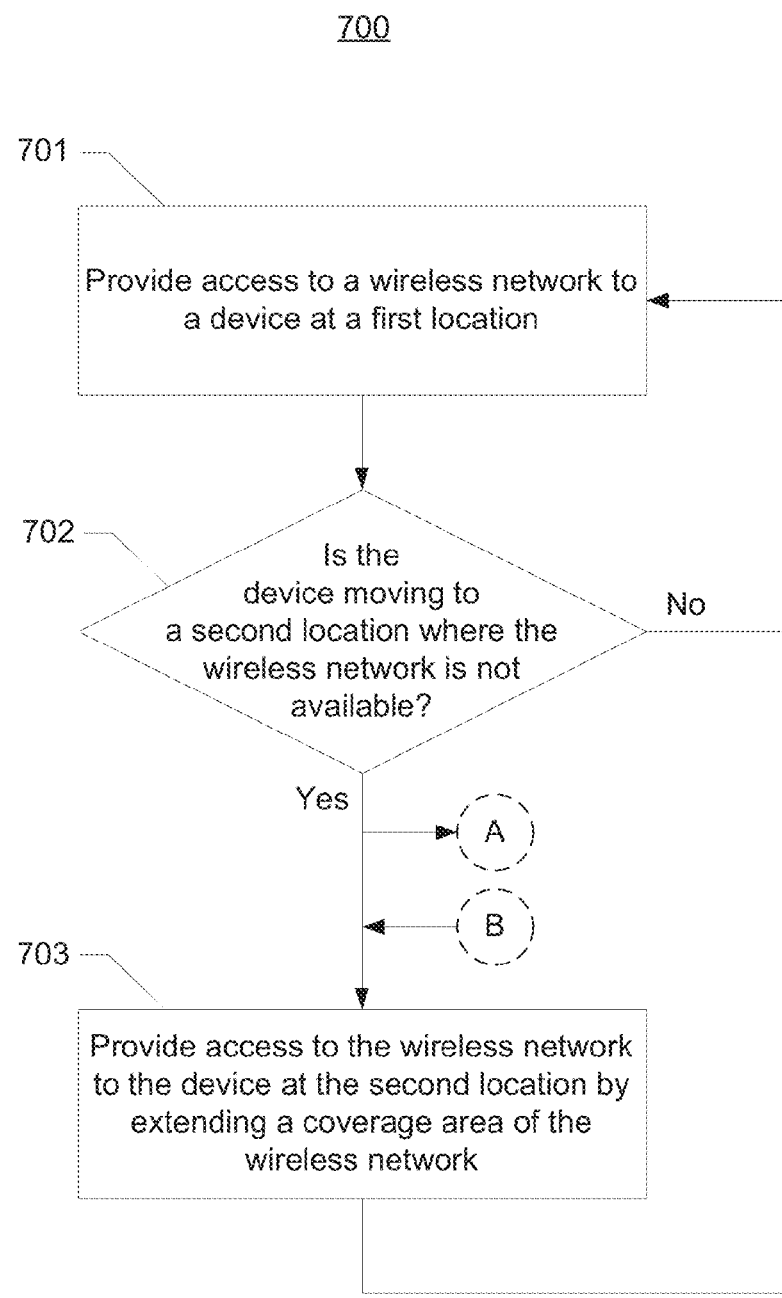
FIG. 7 illustrates an example process flow for providing access to a network at a location where access was not previously available.

FIG. 7 illustrates an example process flow 700 for providing a wireless communications network or access thereto at a location where the wireless network was not previously available (e.g., in a "dead zone"). The wireless network may be any suitable wireless communications network (e.g., cellular, Wi-Fi, WiMAX, satellite) provided by a local office (e.g., local office 103 shown in FIG. 1, local office 350 shown in FIG. 3, local office 450 shown in FIG. 4) using one or more communications access points (e.g.: communications access point 120, gateway 111 shown in FIG. 1; communications access point 310, communications access point 340, gateway 330 shown in FIG. 3; communications access points 410, 420, 430 shown in FIG. 4).

At step 701, a service provider, e.g., via the local office, provides, at a first point in time, access to a wireless network to a user device at a first location. For example, local office 350 shown in FIG. 3 may use communications access point 310 to provide access to a wireless network (e.g., in wireless coverage area 312a) to device 301 located at location 302a at a first point in time. In certain implementations, the wireless network may be associated with a service level agreement that results in predetermined data limits, allocated bandwidths, authentication/encryption processes, or other suitable processes or parameters.

At step 702, the provider or network management entity such as a network administrator determines whether or not the user device is traveling to a second location where the wireless network or access thereto is limited or not available. For example, access to the wireless network at the second location may not be available at a time when the device will enter the second location. In an illustrative example, local office 350 shown in FIG. 3 may monitor device 301 to determine whether device 301 is moving towards an area where wireless coverage is not available (e.g., "dead zone" 320). In certain implementations, local office 350 may determine that device 301 is traveling to location 302b in "dead zone" 320 based on a detected decrease in wireless signal strength. For example, device 301 may be associated with an RSSI of "12.1" as shown in signal strength field 505 of location information row 512 of information 500 shown in FIG. 5, which may be less than a predetermined threshold (e.g., a threshold RSSI of "25.0") for determining that device 301 is moving towards "dead zone" 320. In certain implementations, the service provider may initiate the determination when the user device is located within a predetermined range (e.g., 500 meters) of the boundary of the wireless coverage area to which it is connected. For example, device 301 may be associated with a location indicated in field 504 of location information row 513 of information 500 shown in FIG. 5, which may be a location within area 314a shown in FIG. 3 (e.g., a predetermined range of the boundary of the wireless coverage area 312a).

In another illustrative example, the provider may determine that the user device is traveling to a second location where the wireless network or access thereto is not available based on advance knowledge of route 303 shown in FIG. 3, determining or receiving information indicative of vector 304, location information 500 shown in FIG. 5 associated with the user device, predicted location information 600 shown in FIG. 6 associated with the user device, or any other suitable information or combination of information. For example, the provider may determine that a user device identified in field 503 of location information row 511 shown in FIG. 5 is traveling to a predicted location indicated in field 604 of predicted location information row 611 shown in FIG. 6. The provider may process the information in field 604 and determine that the wireless network is not currently available at the predicted location indicated in field 604 or will not be available at the predicted location indicated in field 604 at the predicted time of arrival indicated in field 607.

If the provider, at step 702, determines that the user device is not traveling to a second location where the wireless network is not available, process 700 may return to step 701 to accommodate subsequent locations of travel of the user device.

If the provider or network administrator, e.g., via the local office, at step 702, determines that the user device is traveling to a second location where the wireless network is limited or not available at a time when the device will enter the second location, process 700 may proceed to step 703. In some embodiments, after determining that that the user device is traveling to a second location where the wireless network is not available at the first time, process 700 may proceed to optional step A, which is discussed in further detail with reference to FIG. 8.

At step 703, the provider (or another network management facility provides, e.g., at a second point in time, access to the wireless network to the user device at the second location by extending the coverage area of the wireless network in accordance with any suitable combination of features or embodiments disclosed herein.

In some embodiments, the coverage area of the wireless network may be extended at step 703 by dynamically changing the power, direction, or both of the communications access point (e.g., by changing the direction, gain, or any other suitable parameter of the communications access point's wireless antenna). For example, the wireless network provided by communications access point 310 shown in FIG. 3 may be configurable to extend wireless coverage area 312a to form wireless coverage area 312b.

In some embodiments, the coverage area of the wireless network may be extended at step 703 by concentrating the wireless network in a particular wireless coverage area based on location density information for a population of users or user devices. For example, the coverage area of the wireless network provided by communications access points 410, 420, and 430 shown in FIG. 4 may be extended to form overlapping wireless coverage area 440.

In some embodiments, the coverage area of the wireless network may be extended at step 703 by transferring services to another wireless network or, when multiple wireless networks are available at the second location, selecting the best wireless network for the user device's use and instructing the user device to transfer to the selected wireless network. For example, device 301 shown in FIG. 3 may be instructed by local office 350 to transfer from the wireless network provided by communications access point 310 to the wireless network provided by communications access point 340 upon nearing or reaching the end of "dead zone" 320. In another example, when device 301 is located at location 302c (e.g., within wireless coverage area 322 provided by communications access point 340 and wireless coverage area 332 provided by gateway 330), local office 350 may analyze the two available wireless networks and select, for example, the wireless network provided by communications access point 340 because it has greater network coverage at the predicted future locations of device 301 (e.g., predicted locations along route 303).

In some embodiments, the coverage area of the wireless network may be extended at step 703 by moving cached data from one server to another server along a user's travel route. For example, in advance of device 301 shown in FIG. 3 transferring service from communications access point 310 to communications access point 340, media content may be copied or moved from content server 362 to content server 364 and transmitted to device 301 from communications access point 340.

After step 703, process 700 may then return to step 701 to accommodate subsequent locations of travel of the user device.

Figure 8:
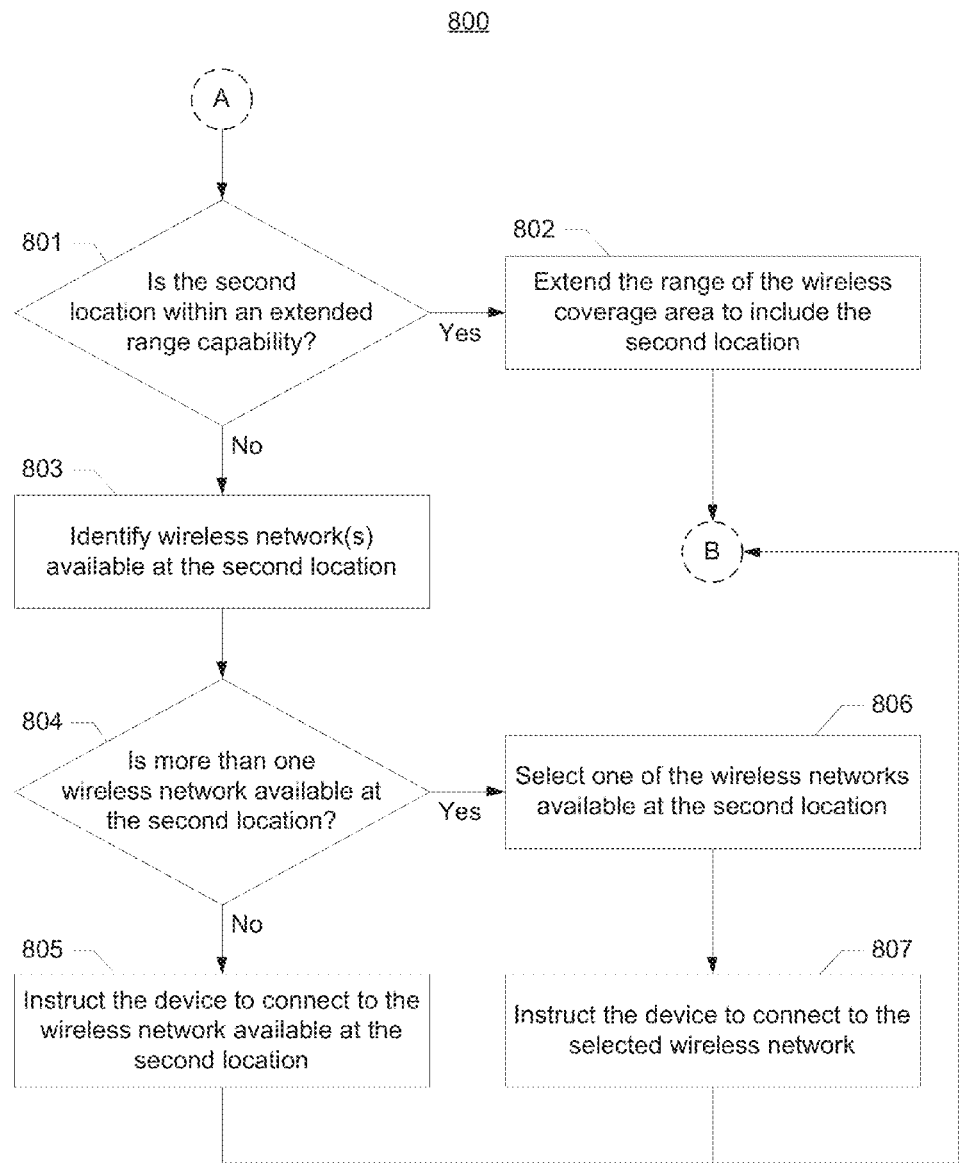
FIG. 8 illustrates an example process flow for extending the coverage area of a network.

FIG. 8 illustrates an example process flow 800 for extending the coverage area of a wireless communications network using a communications access point. Process 800 may be performed, for example, at or in advance of step 703 shown in FIG. 7.

At step 801, the provider or network management entity such as a network administrator, e.g., via the local office, determines whether or not the second location is within an extended range capability of a communications access point or other network component. For example, local office 350 shown in FIG. 3, communications access point 310, or both may determine that location 302b is within an extended range capability of communications access point 310 because location 302b is inside the maximum directionally extendable wireless coverage area indicated by wireless coverage area 312b. In another example, communications access point 310, local office 350 or both may determine that location 302c is not within an extended range capability of communications access point 310 because location 302c is outside the maximum directionally extendable wireless coverage area indicated by wireless coverage area 312b. In certain implementations, the determination may be made in response to processing location information 500 shown in FIG. 5, predicted location information 600 shown in FIG. 6, or both. If the provider determines that the second location is within an extended range capability of the communications access point, process 800 may proceed to step 802. If the provider determines that the second location is not within an extended range capability of the communications access point, process 800 may proceed to step 803.

At step 802, the provider causes the communications access point to extend the range of the wireless coverage area to form an extended wireless coverage area that includes the second location. For example, local office 350 shown in FIG. 3 may cause communications access point 310 to form extended wireless coverage area 312b that includes location 302b in response to predicting that device 301 may be located at location 302b at some point in the future. After step 802, process 800 may proceed to optional step B and return to process 700 shown in FIG. 7.

At step 803, the provider identifies one or more wireless networks available at the second location. For example, local office 350 may identify two wireless networks available at location 302c because a first wireless network provided by communications access point 340 is available at location 302c and a second wireless network is provided by gateway 330 is also available at location 302c.

At step 804, the provider determines whether more than one wireless network is available at the second location. For example, the provider may determine that more than one wireless network is available at the second location if, for example, SSIDs for multiple wireless networks are being broadcast to the second location. In another example, local office 350 shown in FIG. 3 may determine that two wireless networks are available at location 302c because a first available wireless network is provided by communications access point 340 and a second wireless network is provided by gateway 330. In another example, local office 450 shown in FIG. 4 may determine that three wireless networks are available at a location in overlapping wireless coverage area 440 because a wireless network is provided by different communications access points (e.g., communication access points 410, 420, and 430). If the provider determines that more than one wireless network is not available at the second location, process 800 may proceed to step 805. If the provider determines that more than one wireless network is available at the second location, process 800 may proceed to step 806.

At step 805, the provider instructs the user device to connect to the wireless network available at the second location. For example, local office 350 shown in FIG. 3 may transmit (e.g., upon device 301 reaching the end of "dead zone" 320) data to device 301 via communications access point 310 instructing device 301 to initiate a handshake with the wireless network provided by communications access point 340. In certain implementations, the handshake may be performed between the two wireless networks before it is needed (e.g., without the user of the user device's knowledge). Subsequently, when the user device has been instructed to connect to the wireless network available at the second location, the transfer to the new wireless network may occur automatically (e.g., when the user device travels out of the wireless coverage area of the first wireless network). After step 805, process 800 may proceed to step B and return to process 700 shown in FIG. 7.

At step 806, the provider may select one of the wireless networks available at the second location. For example, when multiple SSIDs are available at the second location, the provider may analyze the wireless networks respectively associated with the SSIDs and select one of the wireless networks based on, for example, security requirements, available bandwidth, bandwidth capability (e.g., for maintaining transmission of an HD movie along the user device's route), data rate, wireless signal strength, the user device's route or direction or travel, the cost associated with using the network, the wireless coverage area of the network (e.g., larger coverage areas may increase the possibility of maintaining coverage for a longer duration), or any other suitable criteria. In another example, when device 301 is located at location 302*c* (e.g., within wireless coverage area 322 provided by communications access point 340 and wireless coverage area 332 provided by gateway 330), local office 350 may analyze the two available wireless networks and select, for example, the wireless network provided by communications access point 340 because it has greater network coverage at the predicted future locations of device 301 (e.g., predicted locations along route 303). In certain implementations, the selection may be made in response to processing location information 500 shown in FIG. 5, predicted location information 600 shown in FIG. 6, or both.

At step 807, the provider instructs the user device to connect to the selected wireless network. For example, local office 350 shown in FIG. 3 may select the wireless network provided by communications access point 340 and transmit (e.g., upon device 301 reaching the end of "dead zone" 320) data to device 301 via communications access point 310 instructing device 301 to initiate a handshake with the selected wireless network. After step 807, process 800 may proceed to step B and return to process 700 shown in FIG. 7.

Figure 9:
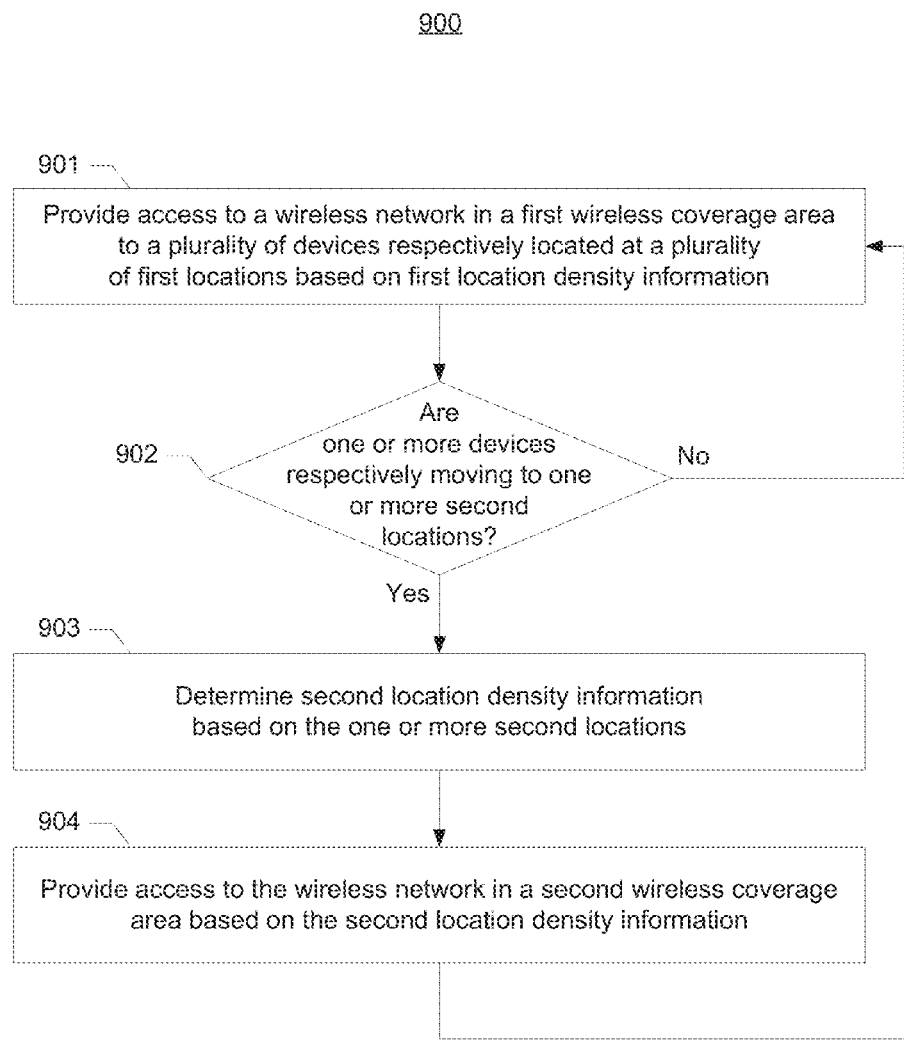
FIG. 9 illustrates an example process flow for providing a wireless communications network based on location density information for a population of user devices.

FIG. 9 illustrates an example process flow 900 for providing access to or extending a wireless communications network in a wireless coverage area based on location density information for a population of user devices or users (e.g., wireless subscribers). In some embodiments, the location density information may include, or be determined from, location information 500 shown in FIG. 5, predicted location information 600 shown in FIG. 6, or both. The wireless network may be any suitable wireless communications network (e.g., cellular, Wi-Fi, WiMAX, satellite) provided by a provider (e.g., via local office 103 shown in FIG. 1, local office 350 shown in FIG. 3, local office 450 shown in FIG. 4) using one or more communications access points (e.g.: communications access point 120, gateway 111 shown in FIG. 1; communications access point 310, communications access point 340, gateway 330 shown in FIG. 3; communications access points 410, 420, 430 shown in FIG. 4).

At step 901, the provider provides, at a first point in time, access to a wireless network in a first wireless coverage area to a plurality of user devices respectively located at a plurality of first locations based on first location density information. For example, local office 450 shown in FIG. 4 may use communications access points 410, 420, and 430 to provide a wireless network in wireless coverage areas 412*a*, 422*a*, and 432*a* based on location density information indicated in location information rows 511-513, 521-523, and 531-533 shown in FIG. 5.

At step 902, the provider determines whether one or more of the user devices are traveling or otherwise moving to one or more second locations. For example, local office 450 may determine that multiple wireless subscribers and their user devices are traveling from locations in regions 412*a*, 422*a*, and 432*a* to a conference venue (e.g., a hotel, an office building) at a location in region 440. In another example, the provider may determine that the user devices respectively identified in field 603 of location information rows 611, 612, 622, 623, 631, and 633 shown in FIG. 6 may be traveling to a predicted location indicated in field 604. In another example, the provider may analyze information 500 shown in FIG. 5, information 600 shown in FIG. 6, or both and determine that user devices are traveling to one or more second locations based on migration patterns determined from increases or decreases in local network traffic or bandwidth consumption of particular communications access points. If the provider determines that one or more of the user devices are traveling to one or more second locations, process 900 may return to step 901 to accommodate subsequent locations of travel of one or more of the user devices. If the provider determines that one or more of the user devices are traveling to one or more second locations, process 900 may proceed to step 903.

At step 903, the provider determines second location density information based on the one or more second locations. For example, the provider may determine predicted location information 600 shown in FIG. 6 as the second location density information or a portion of the second location density information. In certain implementations, the provider may update the user device locations included in the first location density information with the predicted or estimated locations of the user devices. For example, local office 103 shown in FIG. 1 may update location information 500 shown in FIG. 5 with predicted locations indicated in field 604 shown in FIG. 6, predicted times of arrival indicated in field 607, predicted connection information indicated in fields 605 and 606, or any other suitable information to determine the second location density information.

At step 904, the provider provides the wireless network in a second wireless coverage area based on the second location density information. For example, local office 350 shown in FIG. 3 may cause communications access point 310 to directionally extend wireless coverage area 312*a* to form wireless coverage area 312*b* based on second location density information indicating that device 301 is traveling to a predicted or estimated second location (e.g., location 302*b*). In another example, local office 450 shown in FIG. 4 may cause communications access points 410, 420, and 430 to directionally extend their first wireless coverage areas (e.g., areas 412*a*, 422*a*, and 432*a*, respectively) to form second wireless coverage areas (e.g., areas 412*b*, 422*b*, and 432*b*, respectively) and provide overlapping wireless coverage area 440 based on dynamic changes in the population or bandwidth consumption of user devices indicated by the second location density information.

After step 904, the provider may redefine second location density information as the first location density information and the second wireless coverage area as the first wireless coverage area. Process 900 may then return to step 901 to accommodate subsequent locations of travel of one or more of the user devices.

With the features described above, various advantages may be achieved. One advantage of the present technique is that the service provider may provide a wireless network in a "dead zone" without compromising the security of the private network. Another advantage of the present technique is that a negative user experience along a user's route of travel may be avoided in some instances as a result of extending the wireless coverage area of the wireless network, guiding the connection of the user's user device to a different wireless network, or both. As a result, the user's user device may transfer service to a different wireless network with minimal or no loss of service. Another advantage of the present technique is that user communications to a provider (e.g., phone calls, live chat, or emails to a customer service organization associated with the provider) may be reduced because the user's user devices are able to maintain wireless connectivity. Accordingly, user churn (e.g., the loss of subscribers) may be reduced in some instances because the user's wireless computing experience is enhanced.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method comprising:
providing access to a wireless communications network to a user device at a first location;
determining an event for a user associated with the user device based on content of communications generated from user input;
predicting, by a computing device and based on the determined event, that the user device will move to a second location;
determining that the user device will not have access to the wireless communications network at the second location; and
providing, by the computing device, access to the wireless communications network to the user device at the second location by extending a coverage area of the wireless communications network.

2. The method of claim 1, wherein:
the providing access to the wireless communications network at the first location comprises a communications access point providing, in a first wireless coverage area, access to the wireless communications network,
the providing access to the wireless communications network at the second location comprises the communications access point providing, in a second wireless coverage area different from the first wireless coverage area, access to the wireless communications network, and
the extending the coverage area of the wireless communications network comprises extending the first wireless coverage area to form the second wireless coverage area by changing a direction of the communications access point.

3. The method of claim 1, wherein:
the access to the wireless communications network provided at the first location is provided by a first communications access point,
the access to the wireless communications network provided at the second location is provided by a second communications access point different from the first communications access point, and
the extending the coverage area of the wireless communications network comprises transmitting an instruction to the user device to transfer service from the first communications access point to the second communications access point.

4. The method of claim 1, wherein the wireless communications network comprises a first wireless communications network and a second wireless communications network different from the first wireless communications network, and wherein:
the access to the wireless communications network provided at the first location corresponds to a first coverage area of the first wireless communications network, and
the access to the wireless communications network provided at the second location corresponds to a second coverage area of the second wireless communications network.

5. The method of claim 1, wherein the access to the wireless communications network provided at the first location is provided in a first wireless coverage area, the method further comprising:

determining whether the first location is within a predetermined distance from a boundary of the first wireless coverage area,
wherein the predicting that the user device will move to the second location is also based on a determination that the first location is within the predetermined distance from the boundary of the first wireless coverage area.

6. The method of claim 1, wherein the content of communications generated from user input comprises content posted by the user onto a social media account of the user.

7. The method of claim 1, wherein the content of communications generated from user input comprises content on an electronic calendar of the user.

8. The method of claim 1, wherein the first location is within a first wireless coverage area, and wherein the second location is within a second wireless coverage area different from the first wireless coverage area, the method further comprising:
determining first location density information for the first wireless coverage area; and
determining second location density information for the second wireless coverage area,
wherein the providing access to the wireless communications network at the first location comprises providing access to the wireless communications network in the first wireless coverage area based on the first location density information, and
wherein the providing access to the wireless communications network at the second location comprises providing access to the wireless communications network in the second wireless coverage area based on the second location density information.

9. The method of claim 1, wherein:
the access to the wireless communications network provided at the first location is provided at a first time, and
the access to the wireless communications network provided at the second location is provided at a second time later than the first time.

10. A method comprising:
providing, at a first time, access to a wireless communications network to a plurality of user devices respectively located at a plurality of first locations;
determining an event for a user associated with a first user device of the plurality of user devices based on content of communications generated from user input;
predicting, by a computing device and based on the determined event, that the first user device of the plurality of user devices will move to a second location;
determining that the first user device will not have access to the wireless communications network at the second location; and
providing, at a second time later than the first time, access to the wireless communications network to the first user device at the second location by extending a coverage area of the wireless communications network.

11. The method of claim 10, wherein:
the providing access to the wireless communications network at the first time comprises a communications access point providing, in a first wireless coverage area, access to the wireless communications network,
the providing access to the wireless communications network at the second time comprises the communications access point providing, in a second wireless coverage area different from the first wireless coverage area, access to the wireless communications network, and
the extending the coverage area of the wireless communications network comprises extending the first wireless coverage area to form the second wireless coverage area by changing a direction of the communications access point.

12. The method of claim 10, wherein:
the access to the wireless communications network provided at the first time is provided by a first communications access point,
the access to the wireless communications network provided at the second time is provided by a second communications access point different from the first communications access point, and
the extending the coverage area of the wireless communications network comprises transmitting an instruction to the first user device to transfer service from the first communications access point to the second communications access point.

13. The method of claim 10, wherein the wireless communications network comprises a plurality of wireless communications networks, the method further comprising:
selecting one of the plurality of wireless communications networks available at the second location,
wherein the extending the coverage area of the wireless communications network comprises transmitting an instruction to the first user device to transfer service to the selected one of the plurality of wireless communications networks.

14. The method of claim 10, wherein the wireless communications network comprises a first wireless communications network and a second wireless communications network different from the first wireless communications network, and wherein:
the access to the wireless communications network provided at the first time corresponds to a first coverage area of the first wireless communications network; and
the access to the wireless communications network provided at the second time corresponds to a second coverage area of the second wireless communications network.

15. The method of claim 10, wherein the access to the wireless communications network provided at the first time is provided in a first wireless coverage area, the method further comprising:
determining whether a first location of the first user device is within a predetermined distance from a boundary of the first wireless coverage area,
wherein the predicting that the first user device will move to the second location is also based on a determination that the first location is within the predetermined distance from the boundary of the first wireless coverage area.

16. The method of claim 10, wherein the predicting that the user device will move to the second location is also based on a change in a geographic location of the first user device.

17. The method of claim 10, wherein the content of communications generated from user input comprises at least one of social media information, calendar information, electronic communication information, and user preference information.

18. The method of claim 10, wherein the plurality of first locations is within a first wireless coverage area, and wherein the second location is within a second wireless coverage area different from the first wireless coverage area, the method further comprising:
determining first location density information for the first wireless coverage area; and
determining second location density information for the second wireless coverage area,
wherein the providing access to the wireless communications network at the first time comprises providing access to the wireless communications network in the first wireless coverage area based on the first location density information, and
wherein the providing access to the wireless communications network at the second time comprises providing access to the wireless communications network in the second wireless coverage area based on the second location density information.

19. A method comprising:
providing, based on first location density information, access to a wireless communications network to a plurality of devices located in a first wireless coverage area;
determining an event for a user associated with a first device of the plurality of devices based on content of communications generated from user input;
predicting, by a computing device and based on the determined event, that the first device of the plurality of devices will move to a location outside of the first wireless coverage area;
determining that the first device will not have access to the wireless communications network at the location outside of the first wireless coverage area;
determining second location density information for a second wireless coverage area that includes the location outside of the first wireless coverage area; and
providing, in the second wireless coverage area, access to the wireless communications network based on the second location density information.

20. The method of claim 1, wherein the extending the coverage area of the wireless communications network comprises extending the coverage area of the wireless communications network by changing a power of a communications access point configured to provide access to the wireless communications network.

* * * * *